(12) United States Patent
Yamada

(10) Patent No.: US 9,076,085 B2
(45) Date of Patent: Jul. 7, 2015

(54) IMAGE PROCESSING APPARATUS, IMAGE PROCESSING APPARATUS CONTROL METHOD, AND STORAGE MEDIUM

(71) Applicant: CANON KABUSHIKI KAISHA, Tokyo (JP)

(72) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/765,181

(22) Filed: Feb. 12, 2013

(65) Prior Publication Data

US 2013/0208314 A1    Aug. 15, 2013

(30) Foreign Application Priority Data

Feb. 15, 2012  (JP) ................. 2012-030818

(51) Int. Cl.
G06F 3/12    (2006.01)
G06F 3/0488  (2013.01)
G06K 15/02   (2006.01)
H04N 1/00    (2006.01)
H04N 1/04    (2006.01)
G06K 15/00   (2006.01)

(52) U.S. Cl.
CPC .......... *G06K 15/005* (2013.01); *H04N 1/00411* (2013.01); *H04N 1/00448* (2013.01); *H04N 1/00458* (2013.01); *H04N 1/00466* (2013.01); *H04N 1/00482* (2013.01); *H04N 2201/0094* (2013.01); *G06F 3/1208* (2013.01); *G06F 3/1252* (2013.01); *G06F 3/1256* (2013.01)

(58) Field of Classification Search
CPC .................................................. G06F 3/1252
See application file for complete search history.

(56) References Cited

U.S. PATENT DOCUMENTS

| | | | |
|---|---|---|---|
| 2006/0288280 A1* | 12/2006 | Makela | 715/530 |
| 2009/0007007 A1* | 1/2009 | Voros et al. | 715/786 |
| 2010/0125786 A1* | 5/2010 | Ozawa et al. | 715/702 |
| 2011/0074699 A1* | 3/2011 | Marr et al. | 345/173 |
| 2012/0005628 A1* | 1/2012 | Isozu et al. | 715/838 |
| 2012/0075650 A1* | 3/2012 | Tani et al. | 358/1.13 |
| 2012/0192121 A1* | 7/2012 | Bonnat | 715/863 |
| 2012/0218203 A1* | 8/2012 | Kanki | 345/173 |
| 2012/0266104 A1* | 10/2012 | Shah | 715/784 |
| 2013/0111397 A1* | 5/2013 | Miyoshi et al. | 715/784 |
| 2013/0212523 A1* | 8/2013 | Shibata | 715/784 |
| 2013/0326398 A1* | 12/2013 | Zuverink et al. | 715/784 |

FOREIGN PATENT DOCUMENTS

JP    2005-322040 A    11/2005

\* cited by examiner

*Primary Examiner* — Beniyam Menberu
(74) *Attorney, Agent, or Firm* — Canon USA Inc IP Division

(57) ABSTRACT

A scroll distance in a scroll display performed during a preview display of a print job to which a specific printing method is specified is set to be shorter than a scroll distance in a scroll display performed during a preview display of a print job to which the specific printing method is not specified.

7 Claims, 22 Drawing Sheets

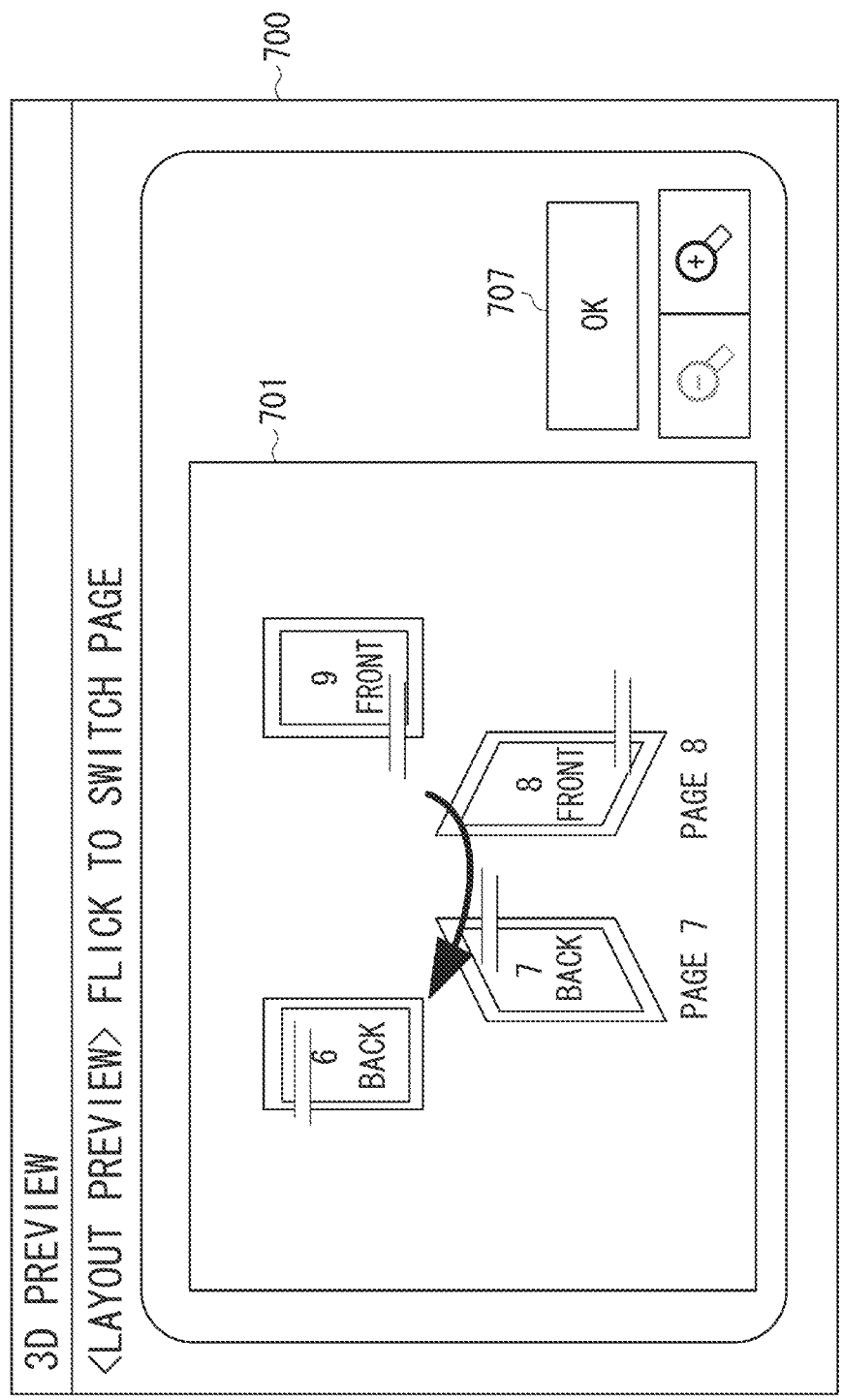

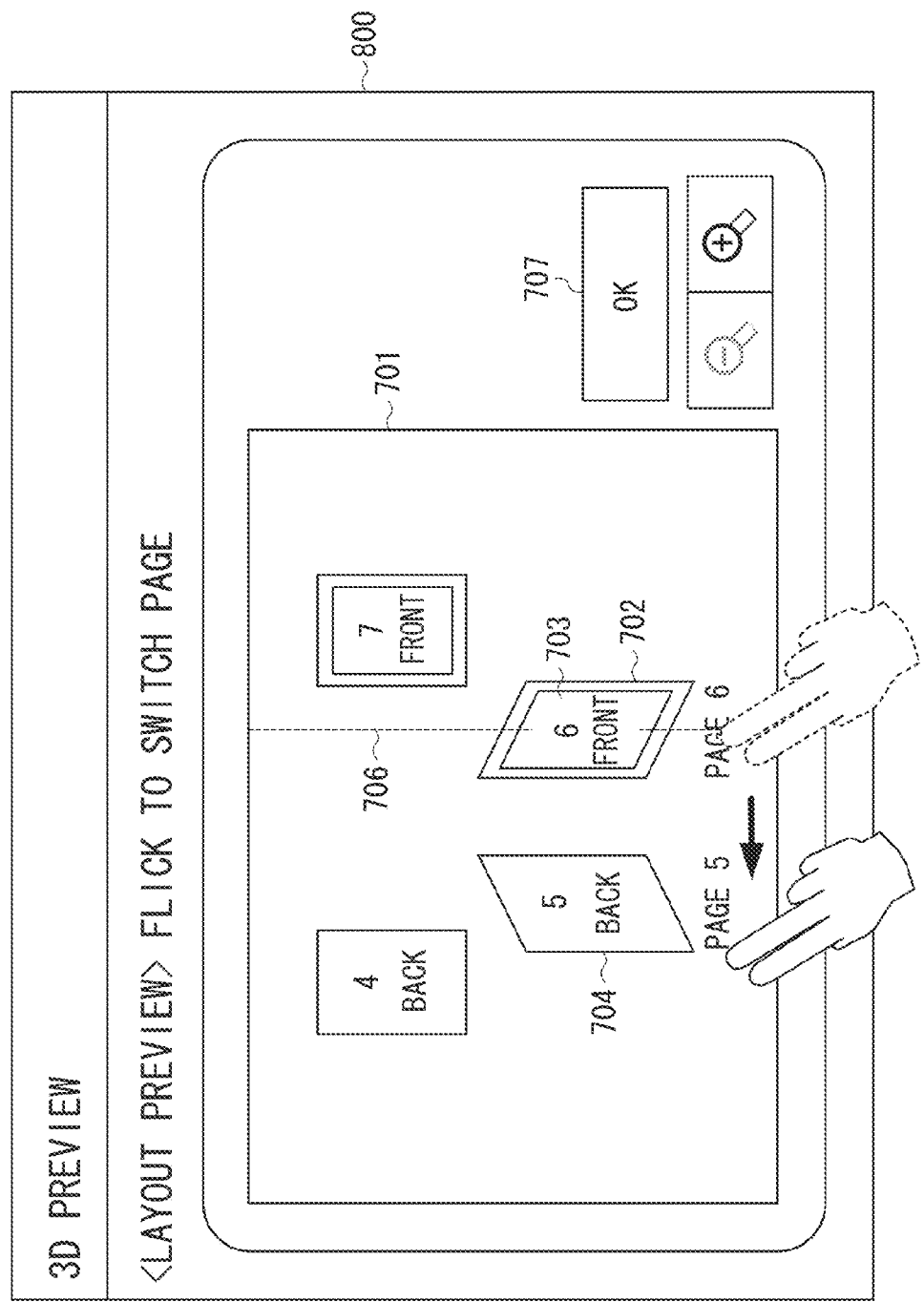

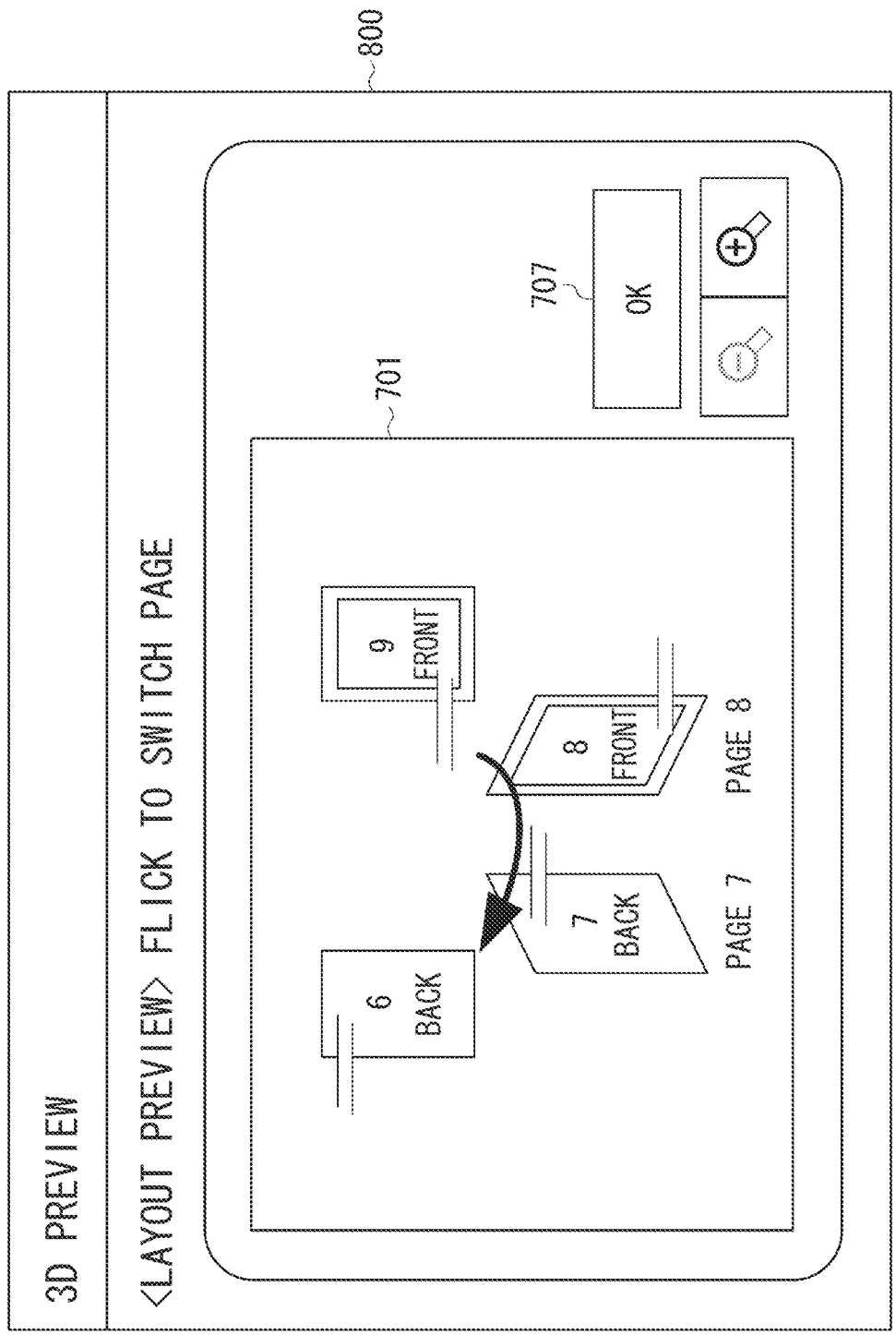

IMAGE PROCESSING APPARATUS, IMAGE PROCESSING APPARATUS CONTROL METHOD, AND STORAGE MEDIUM

BACKGROUND OF THE INVENTION

1. Field of the Invention

The present disclosure relates to an image processing apparatus, an image processing apparatus control method, and a storage medium.

2. Description of the Related Art

In recent years, an information processing apparatus that includes a touch panel has been generally utilized. When utilizing such an information processing apparatus, arbitrary images that are displayed on a screen can be scrolled through by performing a flick operation on the screen. Consequently, a user can scroll each page through by a flick operation to confirm a preview display of scanned images before printing, for example, by arranging a touch panel in a display unit included in a copying machine.

It is common for an image forming apparatus, such as a printer and a copying machine, to include a function of printing images of a plurality of pages on a single paper sheet. Such a function is recently often utilized to reduce costs by saving paper and in consideration of the environment.

An example of a function of printing images of a plurality of pages on a single paper sheet is a page collation function that arranges images of a plurality of pages on one surface of a sheet of printing paper by reducing the size of the images. This function is referred to as an N-in-1 layout, as images of N pages are laid out on one surface of a sheet by reducing the size of the images. For example, when images on two pages are laid out on one surface by reducing their size, this layout is referred to as a 2-in-1 layout, and when images on four pages are laid out on one surface by reducing their size, this is referred to as a 4-in-1 layout. Another example of a function of printing images of a plurality of pages on a single paper sheet is a two-sided printing function.

Japanese Patent Application Laid-Open No. 2005-322040 discusses a page collation function in which a different page collation setting is performed in units of pages. The technique discussed in Japanese Patent Application Laid-Open No. 2005-322040 can provide both of visibility of each page and advantages of the page collation function that can save paper.

Based on the above-described scroll display technique by a flick operation performed on an apparatus that includes a touch panel, a user can be presented with an intuitive and easy-to-understand operation. However, when the scroll display technique is applied to a display of an image in which images of a plurality of pages are laid out on a single sheet, there is an issue that it is conversely more difficult to confirm each and every image laid out on the single sheet due to the smooth scroll display by the flick operation.

For example, when confirming the display of an image reduced in size by a 4-in-1 layout, for example, there is an issue that it is difficult to confirm the reduced images if a scroll display is performed in the same manner as when displaying images for which a page collation function is not set. More specifically, when an image that has been subjected to special image processing like a 4-in-1 layout, for example, is displayed by a smooth scroll display, it is difficult to confirm the content of the image.

The present invention is directed to, in a case where special image processing is set, facilitating confirmation of an image produced by such image processing when a scroll display is performed.

SUMMARY OF THE INVENTION

According to an aspect of the present disclosure, an image forming apparatus includes a display unit including a touch panel, a printing unit adapted to execute a print job, a preview display unit adapted to display a preview of each page of the print job on the display unit before printing the print job, a specification unit adapted to specify a specific printing method for laying out and printing a plurality of pages of documents on one sheet of printing paper as a setting of the print job, and a display control unit adapted to perform a scroll display on each page displayed in preview by the preview display unit according to a flick operation performed on a touch panel, wherein the display control unit is adapted to set a scroll distance in a scroll display performed during a preview display of a print job to which the specific printing method is specified to be shorter than a scroll distance in a scroll display performed during a preview display of a print job to which the specific printing method is not specified.

According to another aspect disclosed herein, an image forming apparatus includes a display unit including a touch panel, a printing unit adapted to execute a print job, a preview display unit adapted to display a preview of each page of the print job on the display unit before printing the print job, a specification unit adapted to specify a specific printing method for laying out and printing a plurality of pages of documents on one sheet of printing paper as a setting of the print job, and a display control unit adapted to perform a scroll display on each page displayed in preview by the preview display unit according to a flick operation performed on a touch panel, wherein the display control unit is adapted to set a scroll speed in a scroll display performed during a preview display of a print job to which the specific printing method is specified to be slower than a scroll speed in a scroll display performed during a preview display of a print job to which the specific printing method is not specified.

According to the present disclosure, in a case where special image processing is set, an image produced by such image processing can be easily confirmed if a scroll display is performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the invention.

FIGS. 7A to 7D illustrate screens displayed during a preview and flick operation performed when two-sided printing is set according to an exemplary embodiment.

FIGS. 8A to 8C illustrate screens displayed during a preview and flick operation performed when one-sided printing is set according to an exemplary embodiment.

DESCRIPTION OF THE EMBODIMENTS

Various exemplary embodiments, features, and aspects of the invention will be described in detail below with reference to the drawings.

In addition, not all of the combinations of the features described in the exemplary embodiments are essential to the solution of the problem according to the present invention.

Figure 1:
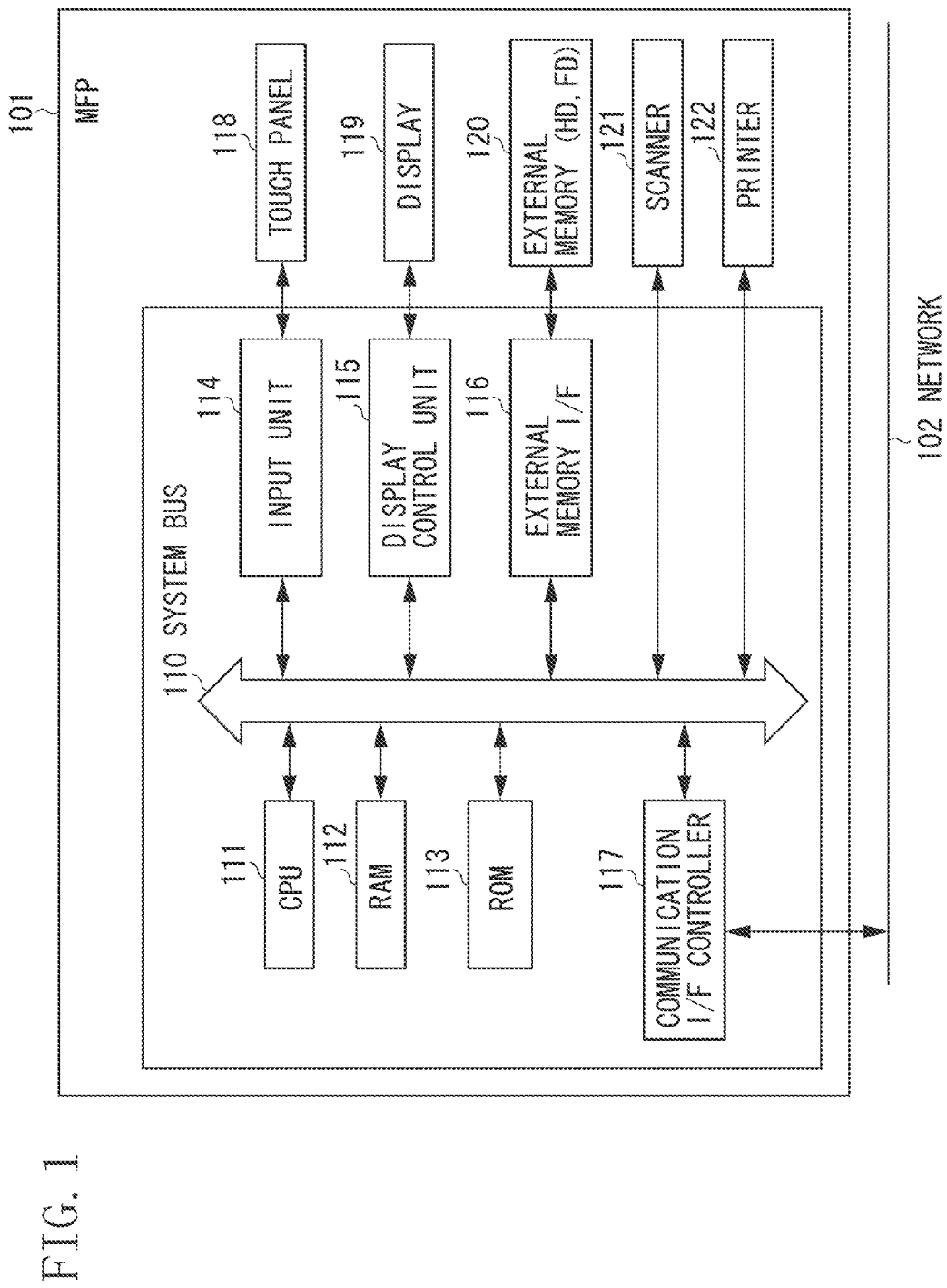
FIG. 1 is a block diagram illustrating a hardware configuration of a multifunction peripheral (MFP) according to an exemplary embodiment.

FIG. 1 illustrates a hardware configuration of a multifunction peripheral (MFP) as an example of an apparatus to which the present disclosure can be applied.

In FIG. 1, a central processing unit (CPU) 111, a random access memory (RAM) 112, a read-only memory (ROM) 113, an input unit 114, a display control unit 115, an external memory interface (I/F) 116, and a communication I/F controller 117 are connected to a system bus 110. Further, a touch panel 118, a display 119, and an external memory 120 are also connected to the system bus 110. Each of the units connected to the system bus 110 can exchange data with each other via the system bus 110.

The ROM 113 is a non-volatile memory, in which image data and other data, and various programs operated by the CPU 111, are stored in predetermined areas, respectively. The RAM 112 is a volatile memory that is used as a temporary storage area, such as a main memory and a work area for the CPU 111. The CPU 111 controls the respective units in the MFP 101 using the RAM 112 as a work memory based on programs stored in the ROM 113, for example. The programs operated by the CPU 111 are not limited to being stored in the ROM 113, they may be stored in advance in the external memory 120 (such as a hard disk).

The input unit 114 receives a user operation, generates a control signal according to the operation, and supplies the generated control signal to the CPU 111. For example, as an input device for receiving a user operation, the input unit 114 may include a character information input device (not illustrated) such as a keyboard, or a pointing device such as a mouse (not illustrated) or the touch panel 118. The touch panel 118 is an input device that is configured to output coordinate information corresponding to a position where a user touches on a flat input unit.

Based on a control signal generated and supplied by the input unit 114 in response to a user operation performed on the input device, the CPU 111 controls each of the units in the MFP 101 according to a program. Consequently, an operation in response to the user operation can be performed on the MFP 101.

The display control unit 115 outputs a display signal for displaying an image on the display 119. For example, a display control signal generated by the CPU 111 according to the program is supplied to the display control unit 115. The display control unit 115 generates a display signal based on the display control signal and outputs the generated display signal to the display 119. For example, the display control unit 115 causes the display 119 to display a graphical user interface (GUI) screen forming a GUI based on the display control signal generated by the CPU 111.

The touch panel 118 is formed integrally with the display 119. For example, the touch panel 118 is configured so that its light transmissivity does not hinder the display on the display 119, and is attached to an upper layer of the display 119 display surface. The input coordinates on the touch panel 118 are associated with the display coordinates on the display 119. Consequently, a GUI can be configured as if an image displayed on the display 119 can be directly operated by the user.

The external memory 120, such as a hard disk, a floppy disk, a compact disc (CD), a digital versatile disc (DVD), and a memory card, can be mounted in the external memory interface (I/F) 116. Based on the control of the CPU 111, data is read from and written onto the mounted external memory 120. The communication I/F controller 117 performs wired or wireless communication with various networks 102, such as a local area network (LAN) and the Internet, based on the control of the CPU 111. On the network 102, various devices, such as a personal computer (PC), another MFP, a printer, and a server, are communicably connected with the MFP 101.

A scanner 121 can read a document and generate image data. A printer 122 can execute a print job based on an instruction from a user input via the input unit 114 or a command input from an external device via the communication I/F controller 117.

The CPU 111 can detect the following operations and states on the touch panel 118. That is, a touch on the touch panel with a finger or a pen (hereinafter referred to as a "touch down"), a state in which a finger or a pen is touching the touch panel (hereinafter referred to as a "touch on"), a state in which a finger or a pen is moving while still touching the touch panel (hereinafter referred to as a "move"), a state when a finger or a pen is lifted away from the touch panel (hereinafter referred to as a "touch up"), and a state in which the touch panel is not touched by anything (hereinafter referred to as a "touch off").

These operations and the position coordinates on the touch panel where a finger or a pen is touching are notified to the CPU 111 via the system bus 110. The CPU 111 determines what kind of operation is performed on the touch panel based on the notified information. Concerning a move, a movement direction of the finger or the pen moving on the touch panel can be determined for the perpendicular component and the horizontal component on the touch panel based on changes in the position coordinates.

An operation in which a touch up is performed after a predetermined move from a touch down on the touch panel is referred to as writing a stroke. An operation in which a stroke is quickly written is referred to as a flick. A flick is an operation in which a finger is quickly moved just a certain distance while touching the touch panel, and then lifted away. In other words, a flick is an operation in which a finger quickly tracks over the touch panel as if to flip on it. The CPU 111 can determine that a flick is performed when a move in a predetermined distance or more at a predetermined speed or greater is detected, and then a touch up is detected.

In addition, when a move in a predetermined distance or more is detected and a touch on is then detected, it is determined that a drag is performed. For the touch panel 118, various types of panels can be employed, such as a resistive film type, a capacitance type, a surface acoustic wave type, an infrared ray type, an electromagnetic induction type, an image recognition type, and a light sensor type.

The processing executed in the thus-configured MFP 101 are described below based on two patterns.

<Pattern 1: In a Case where Page Collation is Set>

Figure 2:
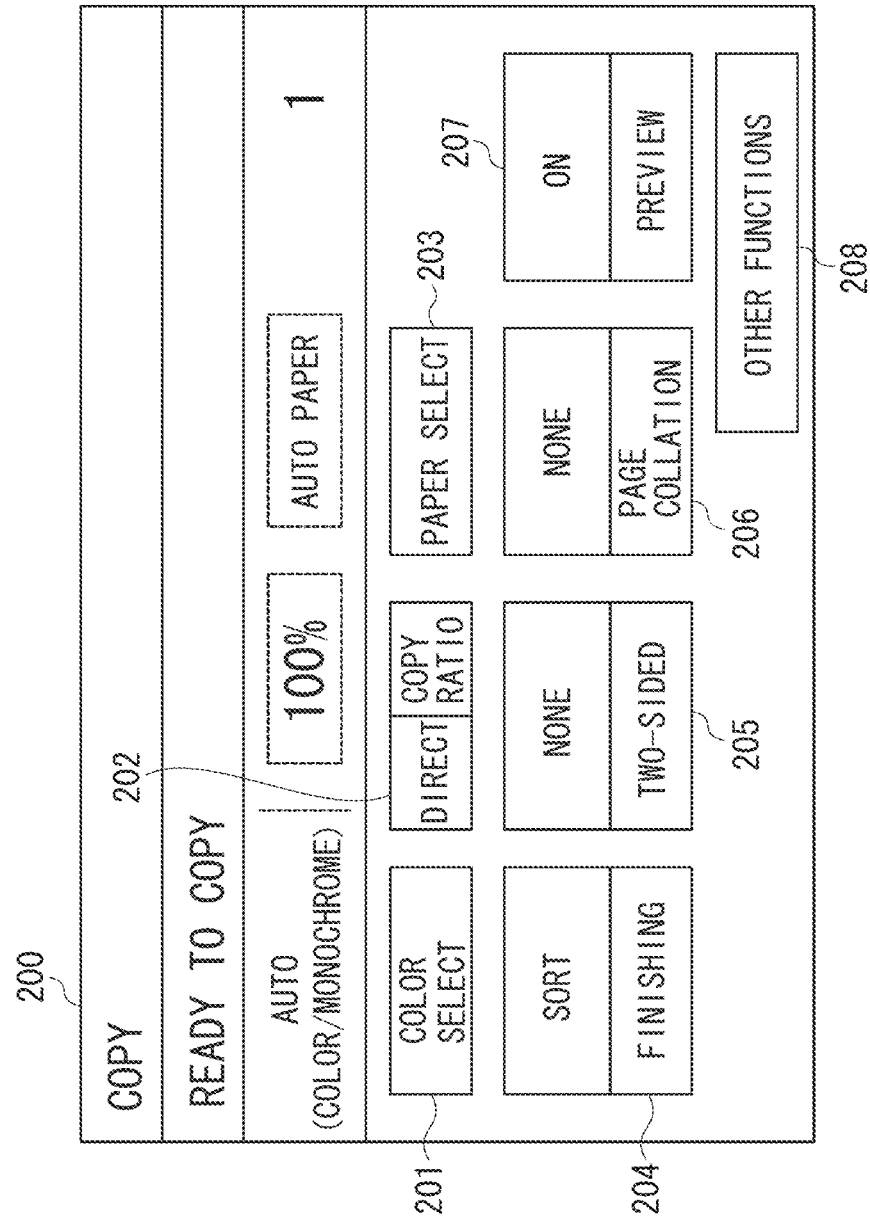
FIG. 2 illustrates an operation screen for a copy operation setting according to an exemplary embodiment.

FIG. 2 illustrates an example of a copy screen 200 displayed on the display 119 when a copy function is executed among the functions that can be executed by the MFP 101. According to the present exemplary embodiment, the MFP can execute page collation printing (N-in-1) in which a plurality of pages (N pages) of documents are laid out on one sheet of printing paper and printed. More specifically, the MFP can execute the page collation printing, such as 2-in-1 layout printing in which two pages of the document are collated on a single surface of printing paper and printed, and 4-in-1 layout printing in which four pages of the document are collated on a single surface of printing paper and printed.

According to the present exemplary embodiment, an image of one page of a document is referred to as a logical page. Therefore, in 2-in-1 layout printing, two logical pages are printed on one surface of a sheet, and in 4-in-1 layout printing, four logical pages are printed on one surface of a sheet. In N-in-1 layout printing, N pages of logical pages are printed on one surface of a sheet. Further, according to the present exemplary embodiment, execution of the page collation printing is not limited to the time of the copy function. The page collation printing can also be executed based on the setting content set in a print job input from an external device, for example.

On the copy screen 200 illustrated in FIG. 2, a button 201 is for setting whether to perform color printing or monochrome printing. A button 202 is for setting a printing magnification. A button 203 is for setting an output sheet. A button 204 is for setting a finishing method, namely, whether to sort and discharge, or whether to execute staple processing, for example. A button 205 is for setting whether to perform two-sided printing or one-sided printing. A button 206 is for setting the above-described page collation.

A button 207 is for setting whether to perform a preview before printing. If preview is set to "ON", the image data generated by the scanner is displayed on the display 119, so that the user can confirm the image before printing. A button 208 is for performing a setting regarding other copy functions. All of these buttons can be specified by a user touching them.

According to the present exemplary embodiment, the user selects the button 206 to execute the page collation printing. When the button 206 is selected, a collation setting screen 300 for performing an advanced setting of the page collation printing is displayed on the display 119.

Figure 3:
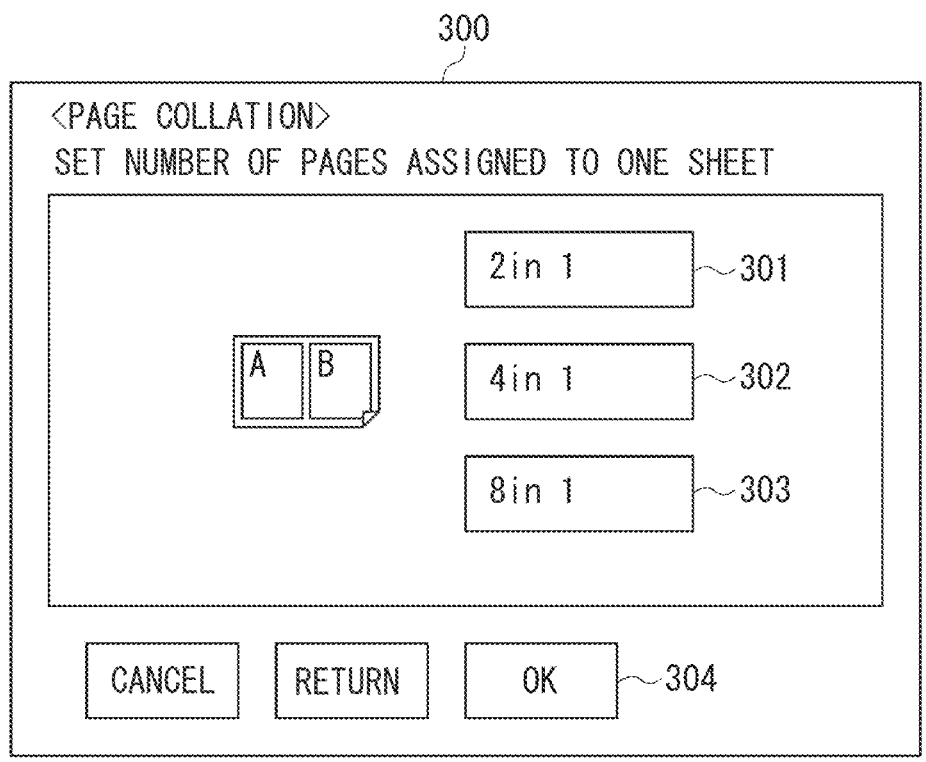
FIG. 3 illustrates an operation screen for an advanced setting of page collation according to an exemplary embodiment.

FIG. 3 illustrates the collation setting screen 300 for performing an advanced setting of the page collation printing that is displayed on the display 119 of the MFP 101. According to the present exemplary embodiment, any of 2-in-1 for collating two logical pages on one surface of a sheet, 4-in-1 for collating four logical pages on one surface of a sheet, and 8-in-1 for collating eight logical pages on one surface of a sheet can be executed as the page collation printing. The user can set the page collation printing by selecting any one of buttons 301 to 303, and pressing an OK button 304.

When the page collation printing setting is performed on the collation setting screen 300, and the button 207 is pressed on the copy screen 200, the setting for previewing a state reflecting the page collation printing setting is completed. Then, when the user presses a start key (not illustrated), reading of the document by the scanner is started based on the setting content, and image data generated by the scanner is displayed as a preview on the display 119. In this case, image data reflecting the page collation printing setting set on the screen illustrated in FIG. 3 is displayed as a preview.

Figure 4A:
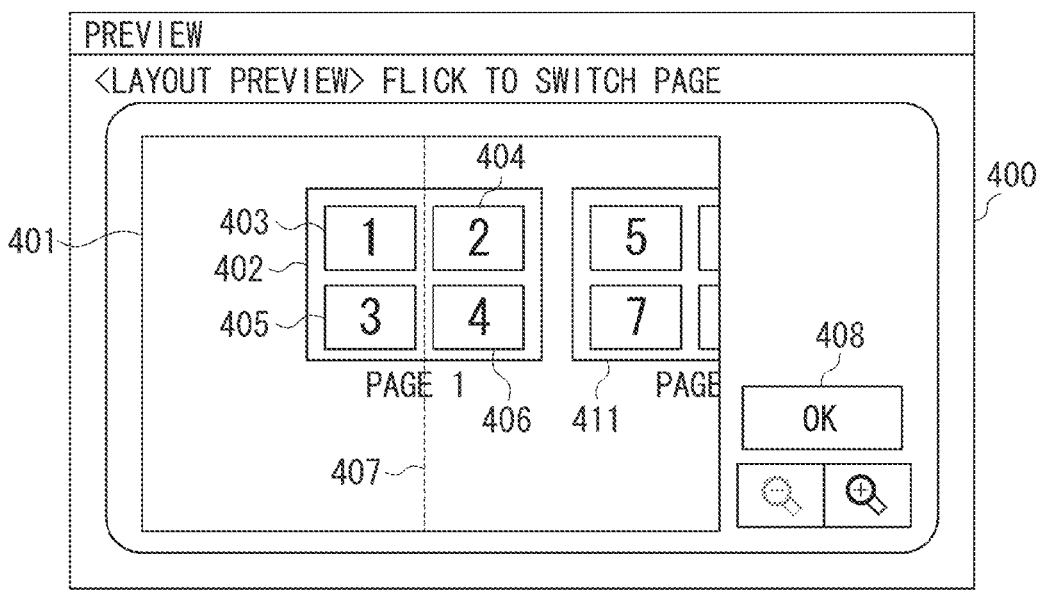
FIGS. 4A to 4D illustrate screens displayed during a preview and flick operation performed when page collation is set according to an exemplary embodiment.

FIG. 4A illustrates a preview screen 400 displayed on the display 119 of the MFP 101. The preview screen 400 illustrated as an example in FIG. 4A includes a preview display 401 of a state in which a 4-in-1 layout is set by the user pressing the button 302 on the collation setting screen 300.

According to the present exemplary embodiment, to distinguish from the above-described "logical page", a page corresponding to a sheet that will actually be printed is referred to as a "physical page". On the preview screen 400, the physical pages correspond to items 402 and 411, and the logical pages correspond to items 403, 404, 405, and 406. A reference line 407 is not actually displayed, rather the CPU 111 uses the reference line 407 as a reference for determining a movement amount during a below-described flick operation.

The logical pages 403 to 406 are displayed using image data generated by the scanner 121 reading a document. Therefore, the user can confirm the layout of the document while looking at the logical pages that will actually be printed on a sheet. In addition, the logical pages 403 to 406 may be displayed using image data that is separately generated for display, such as a thumbnail image, rather than using the actual image data that is generated by the scanner 121 reading the document.

Further, the logical pages 403 to 406 can also be displayed using other image data, rather than using the image data that is generated by the scanner 121 reading the document. For example, image data stored in advance in the external memory 120 can be used. In this case, the page collation printing is executed using the image data stored in the external memory 120. Alternatively, image data received from an external device, such as a PC, connected via the network 102 may be used. In this case, the page collation printing is executed using the image data received from the external device.

After the user confirms the content of the image data laid out on each physical page by performing a below-described flick operation or the like on the preview screen 400, and then presses the OK button, print processing by the printer 122 is started. If the user wishes to cancel printing as a result of confirmation, for example if the preview is not what the user intended, the user can press a cancel button (not illustrated) to terminate the print processing.

Figure 14:
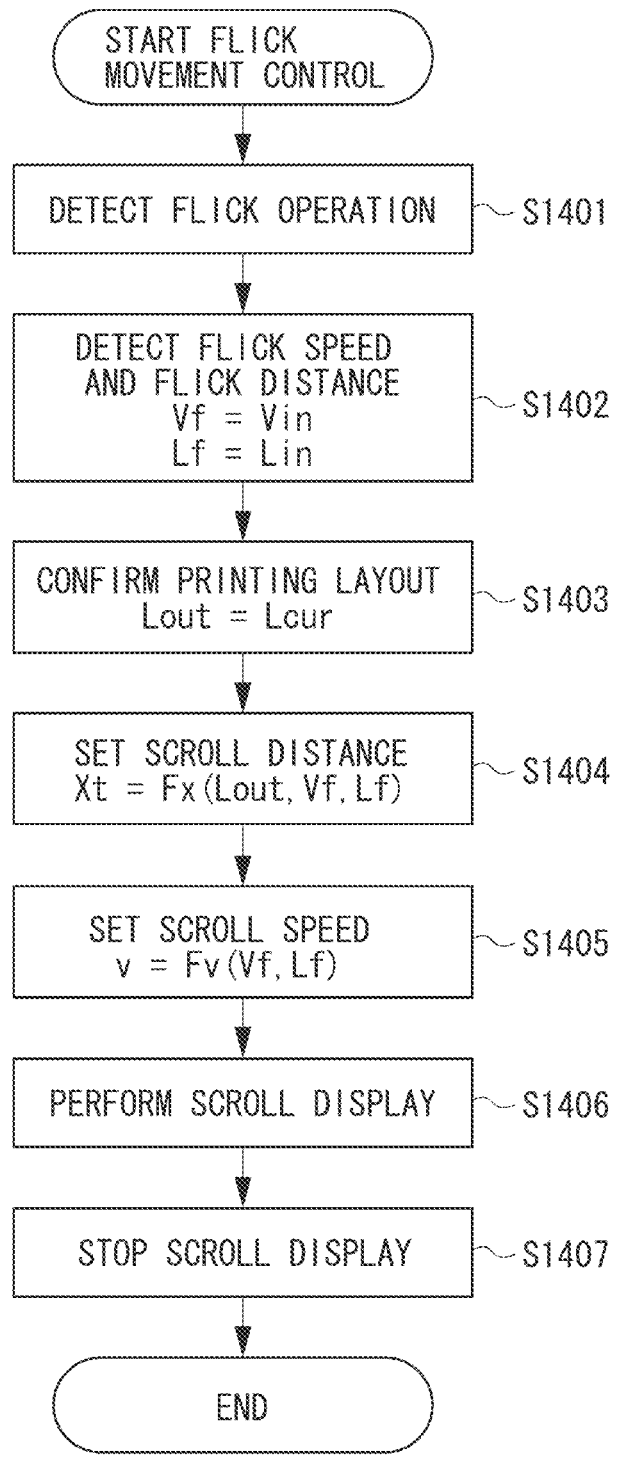
FIG. 14 is a flowchart illustrating an operation of a MFP according to an exemplary embodiment.

Next, the user operations performed when the user wishes to display a different physical page on the preview screen 400 and operations of the MFP 101 will be described in detail below with reference to a flowchart illustrated in FIG. 14. States of the screens displayed on the display 119 at that time will be described with reference to FIGS. 4B to 4D. The processing in each step in the flowchart in FIG. 14 is performed by the CPU 111 in the MFP 101 executing a program. That program is stored in the memory such as the ROM 113 or the external memory 120, and is executed in the RAM 112.

Figure 4B:
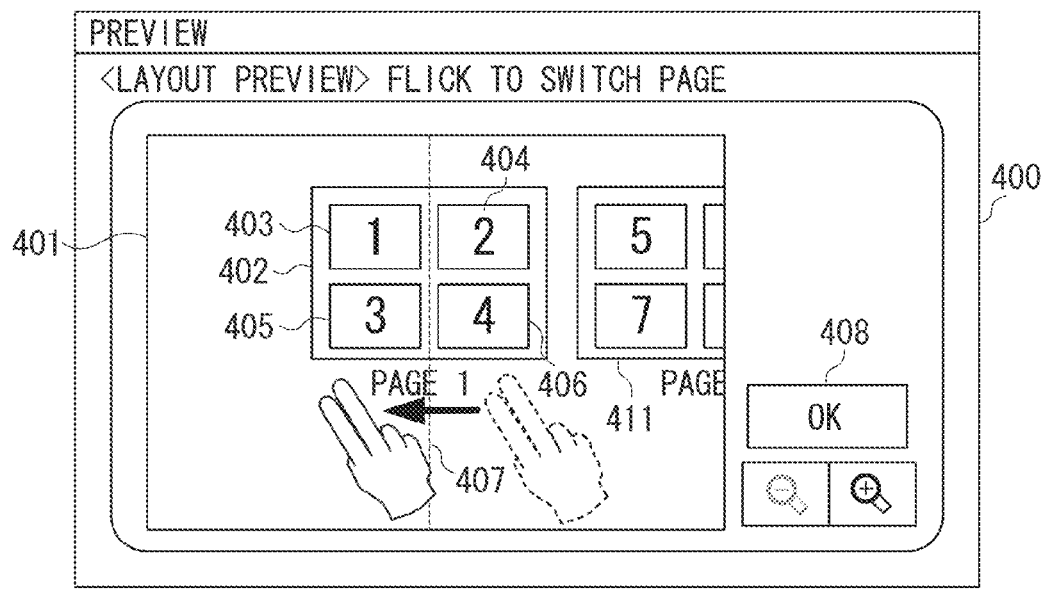
Figure 4C:
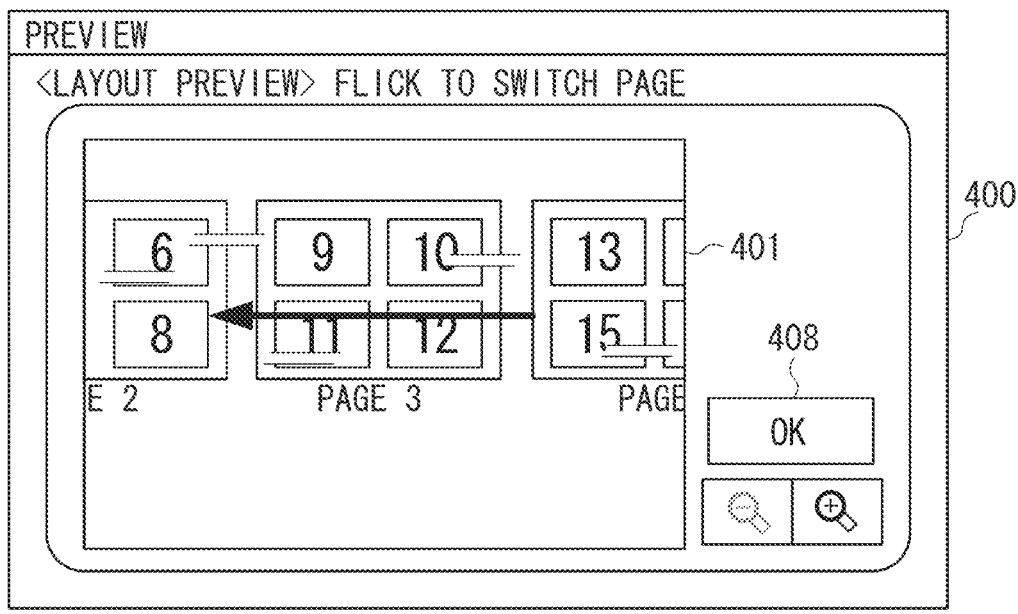
Figure 4D:
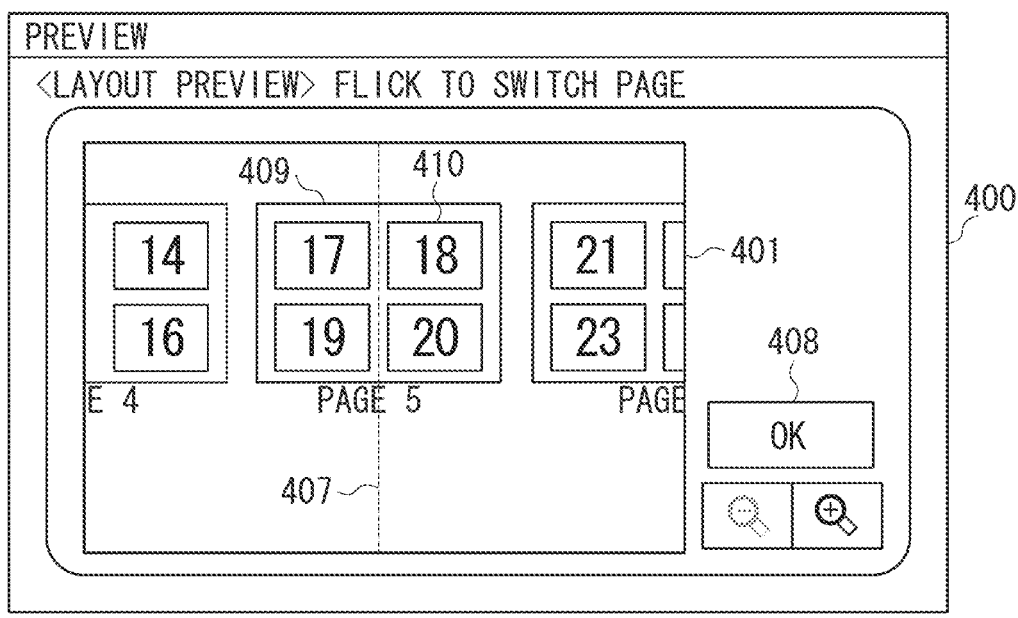

As illustrated in FIG. 4B, the user performs a flick operation on the preview screen 400 in the direction of an arrow in the drawing. Consequently, as illustrated in FIG. 4C, the displayed physical page scrolls in the left direction. Then, when the display has finished scrolling a predetermined distance, the scrolling stops with a predetermined physical page being displayed (FIG. 4D). The flowchart illustrated in FIG. 14 illustrates a series of processing performed by the MFP 101 in association with the flick operation by the user.

First, in step S1401, the CPU 111 detects a flick operation by the user. When detecting the flick operation, the CPU 111 detects the position and the time of a touch down during the flick, and the position and the time of a touch up.

In step S1402, based on these information pieces, the CPU 111 calculates a speed Vf and a distance Lf of the flick. Then, in step S1403, the CPU 111 sets collation setting information Lcur (i.e., 4-in-1 layout in FIG. 4) set on the collation setting screen 300 as a printing layout parameter Lout.

In step S1404, the CPU 111 calculates a scroll distance (movement distance) Xt of the detected flick operation. The scroll distance (movement distance) will serve as information for determining how many pages further along to take the physical page to the position of the reference line 407 by the flick operation performed by the user. The scroll distance can also be referred to as a scroll amount or a movement amount.

According to the present exemplary embodiment, the scroll distance is calculated based on a function which includes the flick speed Vf, the flick distance Lf, and the printing layout parameter Lout as variables. Although generally a scroll distance in a scroll display performed by a flick operation is determined based on a flick speed and a flick distance, the present exemplary embodiment is characterized by using, in addition to these variables, the printing layout parameter Lout.

For example, a value of N when an N-in-1 layout is set is used as the parameter Lout, and the scroll distance calculated in step S1404 can be obtained by dividing the value of the distance calculated based on Vf and Lf by Lout. In this case, the scroll distance when a 2-in-1 layout is set is ½ compared to that when an N-in-1 layout is not set (i.e., a 1-in-1 layout). Further, when a 4-in-1 layout, an 8-in-1 layout, and an N-in-1 layout are set, the scroll distances are respectively ¼, ⅛, and 1/N compared to those when the page collation printing is not set. Further, for example, it is assumed that, when an N-in-1 layout is not set, the scroll distance for a flick operation performed at a predetermined speed and distance is P pages. Further, it is assumed that, when an N-in-1 layout is set, the scroll distance for a flick operation performed at the same speed and distance is a distance to the physical page where the P-th page of the logical pages is laid out. More specifically, in terms of the logical pages, the same pages are displayed whether the N-in-1 layout is set or not, and in terms of the physical pages, the distance is shorter when the N-in-1 layout is set.

No matter what kind of calculation formula is used in step S1404, by considering the Lout value, it is desirable for the scroll distance when the page collation printing is set to be shorter than the scroll distance when the page collation printing is not set. This setting is to prevent a user from overlooking a desired logical page during the scroll display. Obviously, the above-described comparisons of the scroll distances are performed for flick operations performed at the same speed and distance.

After step S1404, in step S1405, the CPU 111 calculates a speed v of the scroll display (scroll speed). The scroll speed is the movement speed of the display screen during the scroll display. Although the faster scroll speed enables the user to reach the target movement destination more quickly, it also makes it more difficult for the user to confirm the contents of the screen during scrolling. Conversely, although a slower scroll speed require more time to reach the target movement destination, it also allows the user to confirm the contents of the screen during scrolling more easily. According to the present exemplary embodiment, the scroll speed is calculated based on a function including the flick speed Vf and the flick distance Lf as variables. More specifically, the faster the flick speed Vf is, or the longer the flick distance Lf is, the faster the scroll speed is.

The scroll speed does not have to be a constant speed over the scroll distance that is travelled. The scroll speed may be reduced as a target location (a scroll distance endpoint) is approached. Therefore, the scroll speed calculated in step S1405 may be an initial speed during scroll display, or an average speed thereof.

After the scroll speed is calculated in step S1405, in step S1406, the CPU 111 performs a scroll display on the display 119 based on the scroll speed and the scroll distance calculated in step S1404. FIG. 4C illustrates an example of a screen during a scroll display.

After performing the display corresponding to the calculated scroll distance based on the calculated scroll speed, and then in step S1407, the CPU 111 stops the scroll display. FIG. 4D is an example of a screen after the scroll display has been stopped, in which, based on the scrolling performed for the scroll distance calculated in step S1404, the reference line 407 is displayed in the middle of an image of the fifth page.

Thus, according to this pattern, when a preview display is scrolled by a flick operation, that scroll distance is determined in consideration of the setting parameter for the page collation printing. More specifically, the scroll distance for a flick operation at the same speed and distance is shorter when the page collation printing is set than when the page collation printing is not set. This configuration can prevent the user from overlooking a desired logical page during the scroll display when the page collation printing is set.

Figure 5A:
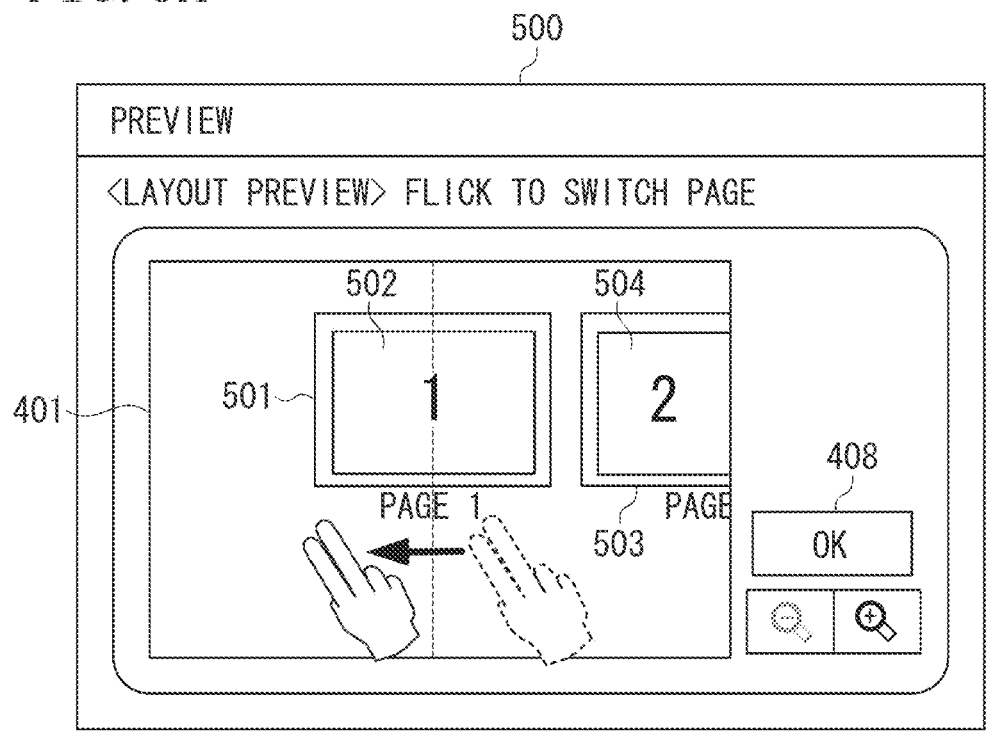
FIGS. 5A and 5B illustrate screens displayed during a preview and flick operation performed when page collation is not set according to an exemplary embodiment.
Figure 5B:
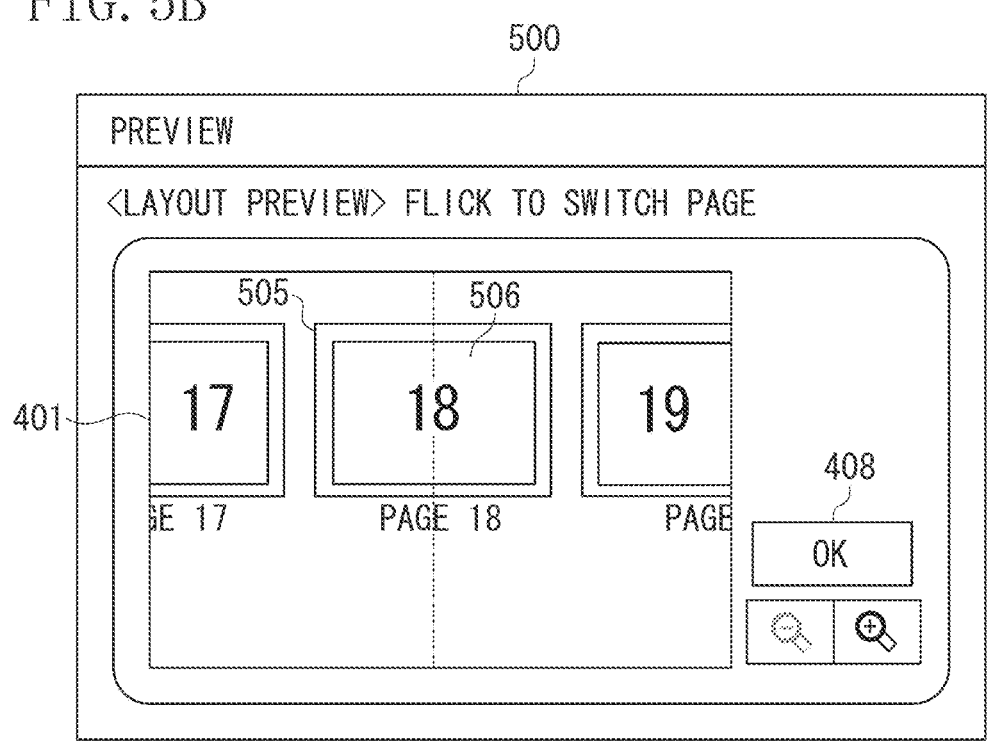

For comparison, FIGS. 5A and 5B illustrate display examples according to a flick operation when a page collation setting is not set (1-in-1). It is assumed that a similar flick operation (flick operation at the same speed and distance) to the flick operation performed on the preview screen 400 illustrated in FIG. 4B, which is displayed when the page collation is set, is performed on a screen in which a physical page 501 is displayed as illustrated in FIG. 5A. In this case, the scrolling is stopped at a page position where a physical page 505 (the eighteenth page) is displayed in the center as illustrated in FIG. 5B.

Additional processing for further improving user operability will be described with reference to FIG. 15.

As described above, a scroll distance may be determined by a method for displaying up to the same logical page as when the page collation printing is not set. In this method, it is assumed that, for example, a 4-in-1 layout is set and a flick operation is performed at a speed and distance corresponding to the movement of only three pages when the page collation printing is not set. In this case, the third logical page in the 4-in-1 layout is displayed on the first physical page. Therefore, although the user has performed the flick operation, a scroll display is not performed, and the display remains stopped. For the user, such a display has poor operability. The processing in steps S1501 and S1502 in FIG. 15 is performed to resolve such poor operability.

Figure 15:
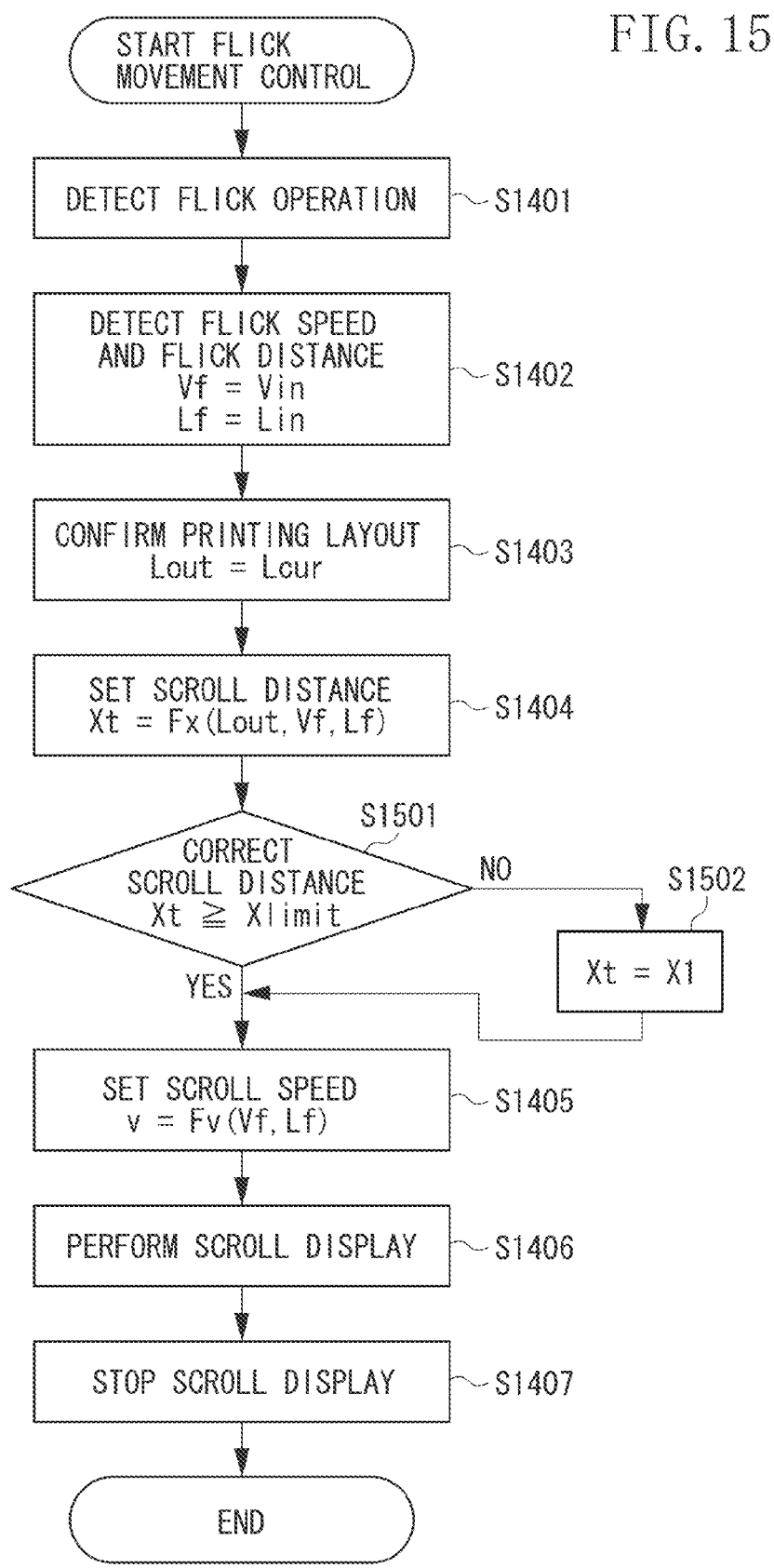
FIG. 15 is a flowchart illustrating an operation of a MFP according to an exemplary embodiment.

Apart from steps S1501 and S1502, FIG. 15 is the same as FIG. 14, so the same step numbers are employed. The differences with FIG. 14 will be described below.

When the scroll distance is calculated in step S1404, the processing proceeds to step S1501. In step S1501, the CPU 111 corrects the scroll distance. More specifically, the CPU 111 determines whether the calculated scroll distance Xt is equal to or greater than a predetermined threshold Xlimit. If it is determined that the scroll distance Xt is less than the threshold (NO in step S1501), the processing proceeds to step S1502. In step S1502, the CPU 111 sets a value X1 for the scroll distance Xt. For example, if the threshold Xlimit is 1 and the scroll distance Xt is 0, which is smaller than 1, in step S1502, the predetermined "1" as the value X1 is set to the scroll distance Xt.

Consequently, even in a case like the above example, i.e., when the scroll distance is calculated to be zero, the scroll display can be made to move a minimum page amount (1 page worth). Therefore, a situation in which the display remains stopped even though a flick operation is performed can be eliminated.

<Pattern 2: In a Case where Two-Sided Printing is Set>

In the flick operation control of the pattern 1, as illustrated in FIG. 4, the flick operation control performed when page collation is set is described in which a plurality of logical pages is reduced in size and laid out on one surface of a single physical page.

In contrast, in the present pattern, flick operation control performed when two-page printing is set is described, in which individual logical pages are respectively laid out on either surface of a single physical page.

In the present pattern, on the copy screen illustrated in FIG. 2, the user can set the two-sided printing for printing two pages of the document on either surface of a single page by selecting the button 205. According to the present pattern, execution of the two-sided printing is also not limited to the time of the copy function. The two-sided printing can also be executed based on the setting content set in a print job input from an external device, such as a PC.

When the button 205 is selected, a two-sided printing setting screen 600 (illustrated in FIG. 6) for performing an advanced setting of the two-sided printing is displayed on the display 119. The user can perform an advanced setting of the two-sided printing on the screen illustrated in FIG. 6. By pressing a desired button among two-sided printing advanced setting buttons 601, 602, and 603, a document to be read and the print setting relating to the two-sided printing can be selected. Further, by pressing either of the two-sided direction buttons 604 and 605, the type of the two-sided printing direction can be set. After these advanced settings have been performed, the two-sided printing setting is finished by pressing an OK button 606.

When the advanced setting of the two-sided printing is performed on the two-sided printing setting screen 600 and the button 207 is pressed on the copy screen 200, the setting for previewing a state reflecting the two-sided printing setting is complete. Then, when the user presses a start key (not illustrated), reading of the document by the scanner is started according to the setting content, and image data generated by the scanner is displayed as a preview.

According to the present exemplary embodiment, a three-dimensional (3D) preview screen is displayed when the two-sided printing is set. However, a two-dimensional preview screen similar to that illustrated in FIG. 4 may be displayed as described in the pattern 1 in the initial setting. At that time, the present exemplary embodiment may be configured to arrange a button (not illustrated) for selecting a preview mode so that the user can arbitrarily select whether to display a two-dimensional preview screen or a three-dimensional preview screen.

Figure 7A:
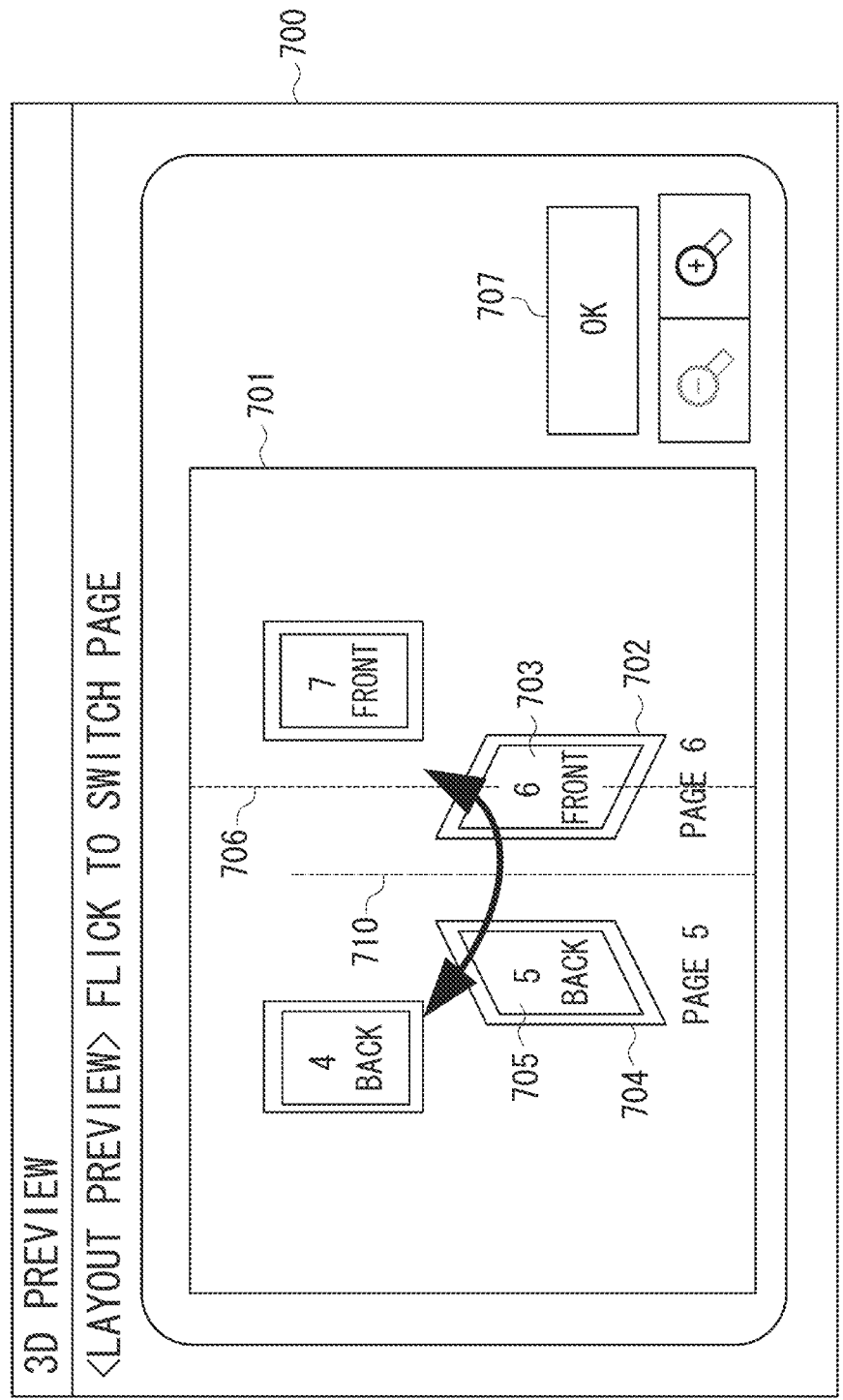

FIG. 7A illustrates a 3D preview screen 700. The 3D preview screen 700 includes preview display 701 of a state in which the two-sided printing is set.

In the present pattern, a page corresponding to a sheet that will actually be printed is also referred to as a "physical page". On the 3D preview screen 700, the physical pages correspond to items 702 and 704, and the logical pages correspond to items 703 and 705. Further, a reference line 706 is not actually displayed, rather the CPU 111 uses the reference line 706 as a reference for determining a movement amount during a below-described flick operation.

As illustrated in FIG. 7A, on the 3D preview screen 700, a page position can be moved in the direction of an arrow in the drawing, and a front side and a rear side of a physical page switch at a dashed line 710 as a boundary. By three-dimensionally displaying physical pages in such a manner, the user can easily confirm whether each logical page is laid out on the front side or the rear side in the two-sided printing preview.

Similar to the pattern 1, the logical pages 703 and 705 are displayed using the image data obtained by the scanner 121 reading the document. In addition, the logical pages 703 and 705 can be displayed using image data that is separately generated for display, such as a thumbnail image. Further, the logical pages 703 and 705 can also be displayed using other image data without limiting to the image data obtained by the scanner 121 reading the document. As another example, image data which is stored in advance in the external memory 120 can be used. In this case, the two-sided printing is executed using the image data stored in the external memory 120.

Figure 7B:
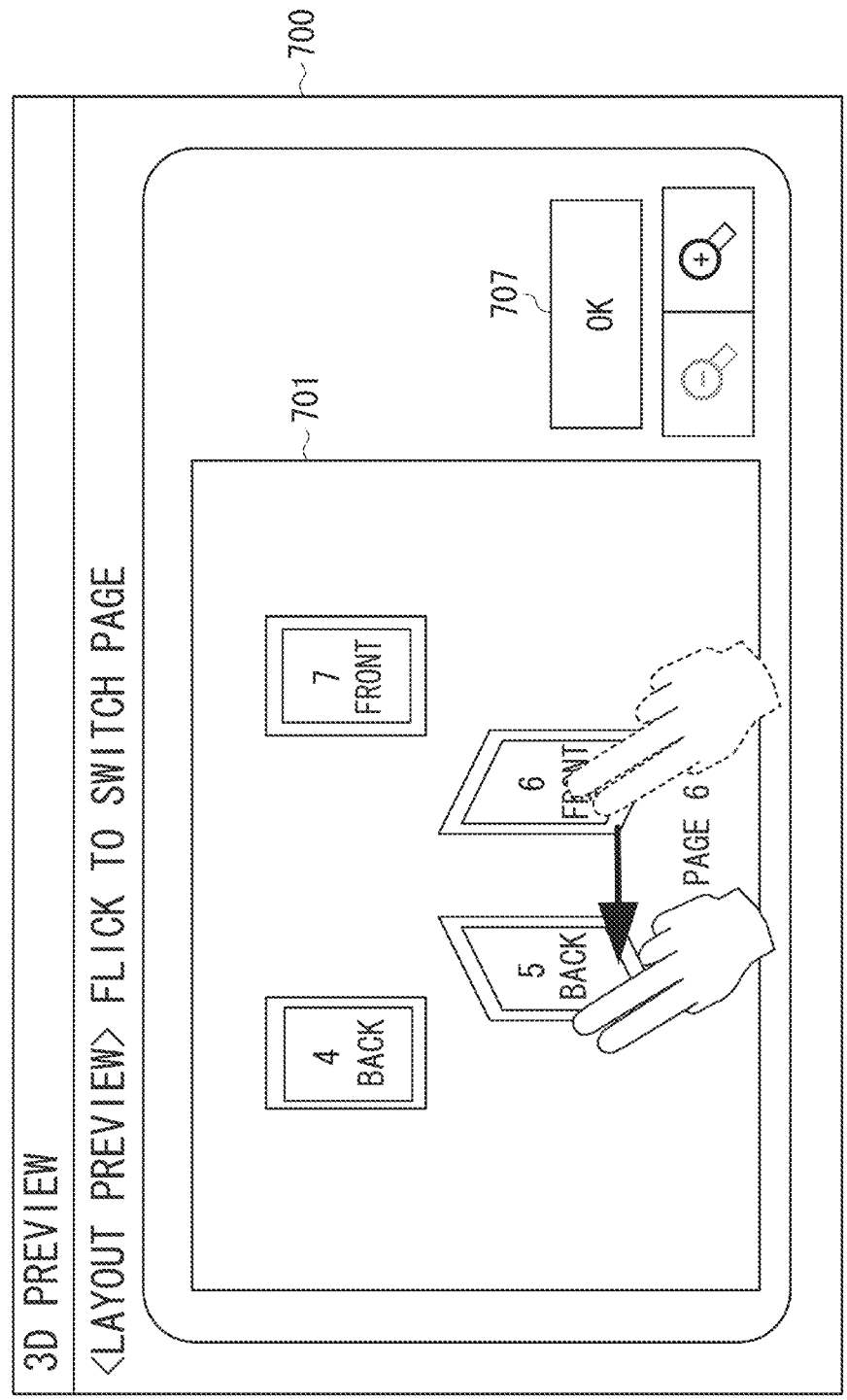
Figure 7D:
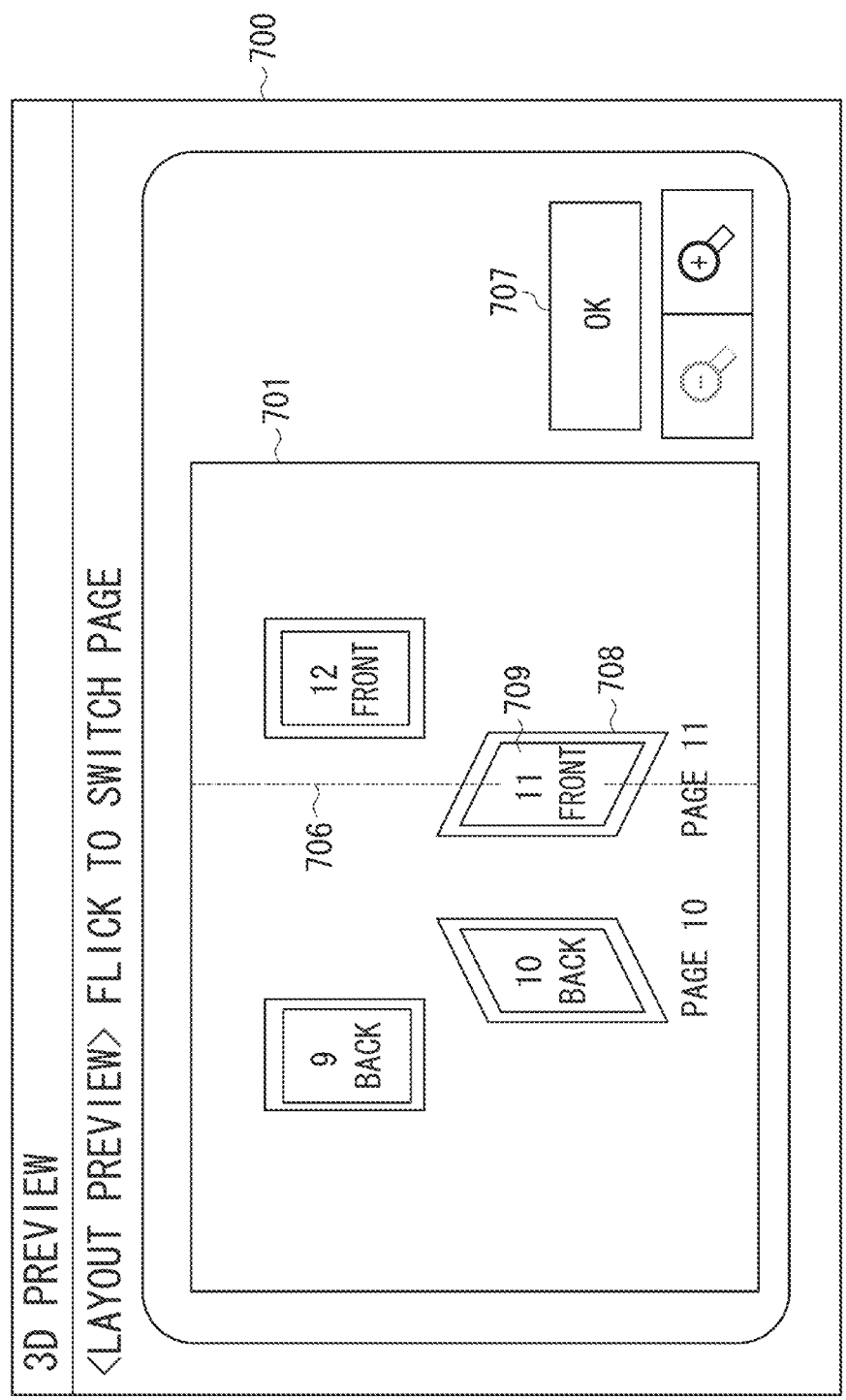

Next, user operations to be performed when the user wants to display a separate physical page on the 3D preview screen 700, and screen states displayed on the display 119 at that time will be described in detail with reference to FIGS. 7B to 7D. In the pattern 2, similar to the pattern 1, the processing is executed according to the flowchart illustrated in FIG. 14 (or FIG. 15). More specifically, the printing layout parameters set in step S1403 are contents set on the two-sided printing setting screen 600. For example, the control of the scroll distance and the scroll speed performed during the two-sided printing setting is the similar control to that performed when a 2-in-1 layout is set when the page collation printing described in the pattern 1 is set.

As illustrated in FIG. 713, the user performs a flick operation on the 3D preview screen 700 in the direction of an arrow in the drawing. Consequently, as illustrated in FIG. 7C, the displayed physical page is scrolled so as to proceed in the direction to the left and further away, as indicated by an arrow. Since the control of the scroll display speed and the control of the scroll distance until stopping are similar to that in the flowchart in FIG. 14, a description thereof is omitted here.

A screen illustrated in FIG. 4D is an example of a screen displayed when scrolling has stopped. In FIG. 7D, scroll movement is started by a flick from the front surface of a physical page 702 (the sixth page) on the reference line 706 in FIG. 713, and stops at the front surface of a physical page 708 (the eleventh page), which is 10 logical pages further along.

Figure 8C:
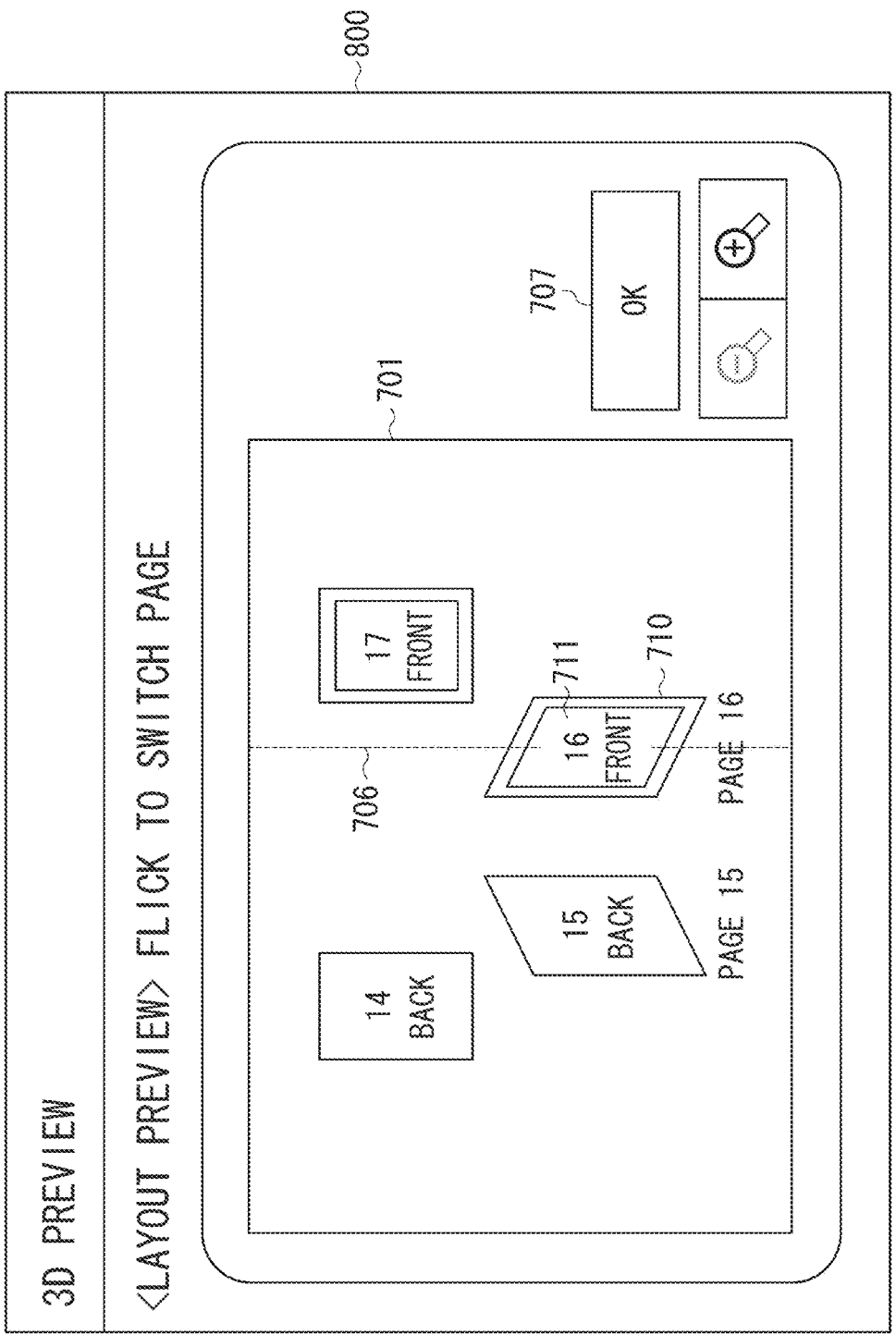

For comparison, FIGS. 8A to 8C illustrate preview display examples according to a flick operation when the two-sided printing is not set (one-sided printing). It is assumed that a similar flick operation (same speed and distance) to the flick operation performed on the 3D preview screen 700, which is displayed when the two-sided printing is set, is performed when a front surface of a physical page 702 displayed as illustrated in FIG. 8A. The preview screen scrolls as illustrated in FIG. 8B, and stops at a front surface of a physical page 710 (the sixteenth page) as illustrated in FIG. 8C. This is because the scroll distance Xt is set to a greater distance than that when the two-sided printing is set by the Lout parameter in step S1404 in the flowchart in FIG. 14. As a result of the scrolling, the number of logical pages that are scrolled through is the same.

Thus, according to the present pattern, when a preview display is scrolled by a flick operation, that scroll distance is determined in consideration of the two-sided printing setting parameter. More specifically, the scroll distance for a flick operation at the same speed and distance is shorter when the two-sided printing is set than when the two-sided printing is not set. This configuration can prevent the user from overlooking a desired logical page during the scroll display when the two-sided printing is set.

Although in the present exemplary embodiment is described above by separating the page collation printing and the two-sided printing into different patterns, both of these cases share the feature that a plurality of logical pages is laid out on a single physical page. In the page collation printing, a plurality of logical pages is reduced in size and laid out on one physical page. On the other hand, in the two-sided printing, separate logical pages are respectively laid out on the front and rear surfaces of one physical page. When a preview display of an image to which such a specific print setting is set is performed, the user's convenience remarkably improves by executing the operation control at the time of a flick operation in the manner illustrated in FIG. 14 (or FIG. 15).

The page collation printing and the two-sided printing are not mutually exclusive settings, both of these settings can be simultaneously performed. In other words, the two-sided printing can be set in addition to the setting of the 2-in-1 layout, for example. Obviously, the present exemplary embodiment can be applied to an image to which such a layout is set.

The flick operation control according to the first exemplary embodiment is characterized in that, as illustrated in FIGS. 4 and 7, when a plurality of logical pages is laid out on a single physical page, a scroll distance during a preview display is changed based on the layout setting.

In contrast, flick operation control according to a second exemplary embodiment is characterized in that, when a plurality of logical pages is similarly laid out on a single physical page, a scroll speed during a preview display is changed based on the layout setting.

Figure 6:
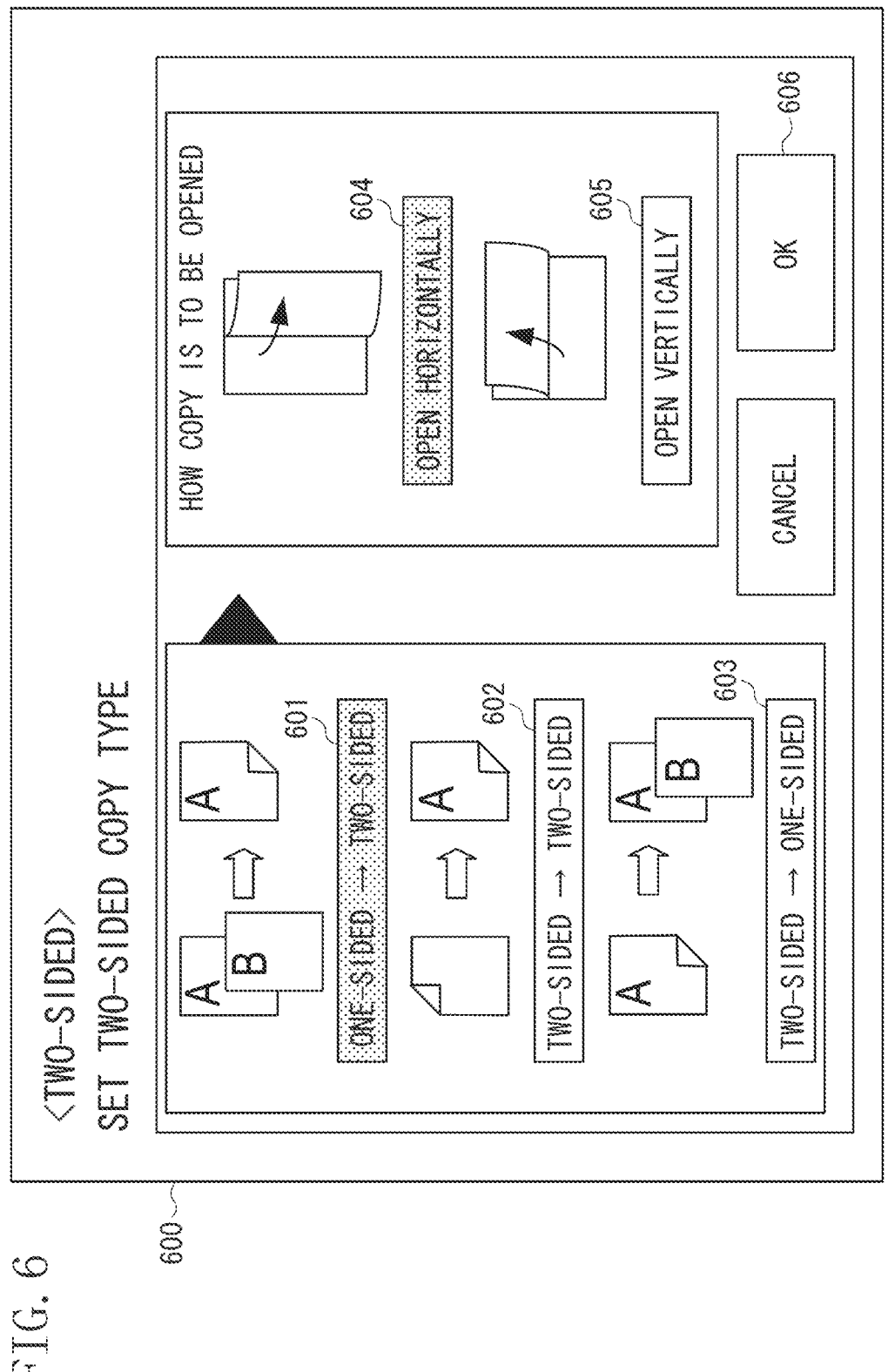
FIG. 6 illustrates an operation screen for an advanced setting of two-sided printing according to an exemplary embodiment.

The present exemplary embodiment will also be described using the MFP 101 illustrated in FIG. 1 as an example. Further, since the various setting screens illustrated in FIGS. 2, 3, and 6 are similar to those in the first exemplary embodiment, and operations performed by a user up to setting of page collation printing and two-sided printing are similar to those in the first exemplary embodiment, descriptions thereof will be omitted.

Figure 16:
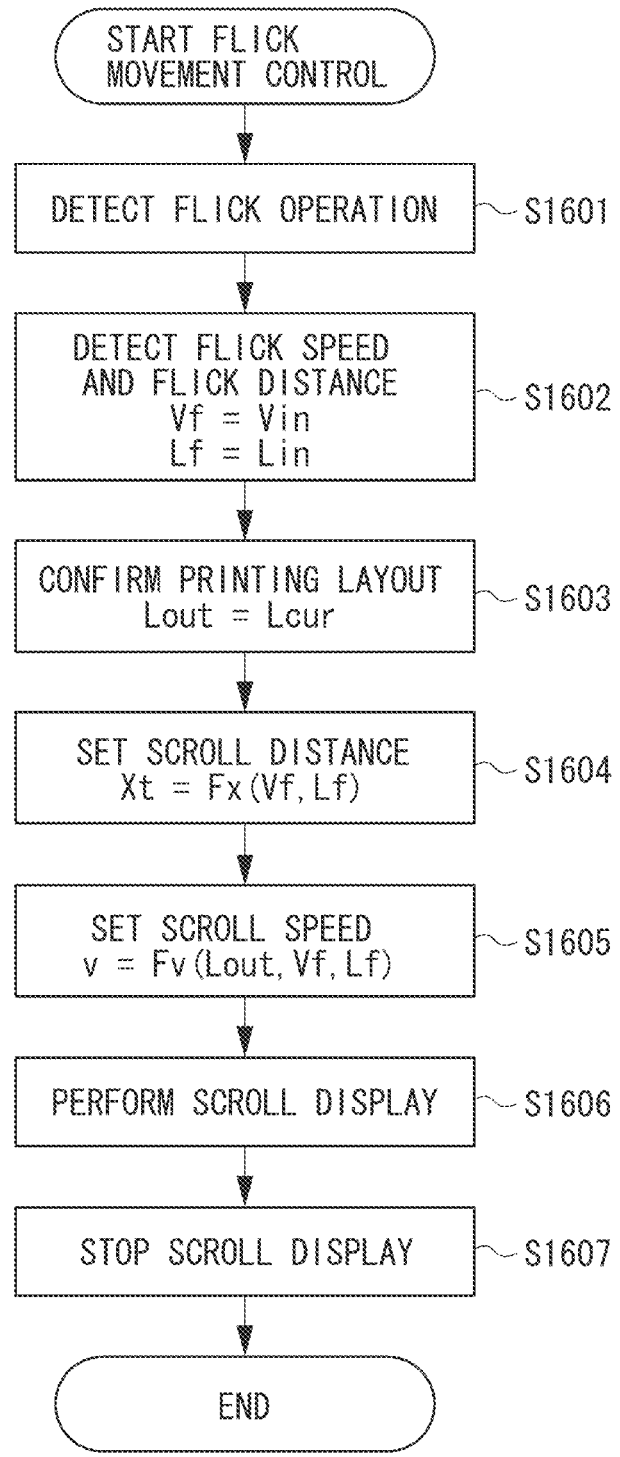
FIG. 16 is a flowchart illustrating an operation of a MFP according to an exemplary embodiment.

According to the present exemplary embodiment, the processing executed by the MFP 101 when a user starts a flick operation at a page position on the screen in which the physical page 402 (the first page) is displayed in the center as illustrated in FIG. 4B will be described with reference to the flowchart illustrated in FIG. 16. In addition, a state of a screen displayed on the display 119 at that time will be described with reference to the flowchart illustrated in FIG. 9. The processing in each step in the flowchart in FIG. 16 is performed by the CPU 111 in the MFP 101 executing a program. That program is stored in the memory such as the ROM 113 or the external memory 120, and is executed in the RAM 112.

First, in step S1601, the CPU 111 detects a flick operation by the user. When detecting the flick operation, the CPU 111 detects the position and the time of a touch down during the flick, and the position and the time of a touch up.

In step S1602, based on these information pieces, the CPU 111 calculates a speed Vf and a distance Lf of the flick. Then, in step S1603, the CPU 111 sets collation setting information Lcur (i.e., 4-in-1 layout in FIG. 4) set on the collation setting screen 300 as a printing layout parameter Lout.

In step S1404, the CPU 111 calculates a scroll distance (movement distance) Xt of the detected flick operation. According to the present exemplary embodiment, the scroll distance is calculated based on a function which includes the flick speed Vf and the flick distance Lf as variables.

After step S1604, in step S1605, the CPU 111 calculates a speed v of the scroll display (scroll speed). According to the present exemplary embodiment, the scroll speed is calculated based on a function which includes the flick speed Vf, the flick distance Lf, and the printing layout parameter Lout as variables. Although generally a scroll speed in a scroll display performed by a flick operation is determined based on only a flick speed and a flick distance, the present exemplary embodiment is characterized by using, in addition to these variables, the printing layout parameter Lout.

For example, a value of N when an N-in-1 layout is set is used as the parameter Lout, and the scroll speed calculated in step S1605 can be obtained by dividing the value of the speed calculated based on Vf and Lf by Lout. In this case, the scroll speed when a 2-in-1 layout is set is ½ compared to that when an N-in-1 layout is not set (i.e., a 1-in-1 layout). Further, when a 4-in-1 layout, an 8-in-1 layout, and an N-in-1 layout are set, the scroll speeds are respectively ¼, ⅛, and 1/N compared to those when the page collation printing is not set.

No matter what kind of calculation formula is used in step S1605, it is desirable for the scroll speed when the page collation printing is set to be slower than the scroll speed when the page collation printing is not set by considering the Lout value. This setting is to prevent a user from overlooking a desired logical page during the scroll display. Obviously, the above-described comparisons of the scroll distances are performed for flick operations performed at the same speed and distance.

The scroll speed does not have to be a constant speed over the scroll distance that is travelled. The scroll speed may be reduced as a target location (a scroll distance endpoint) is approached. Therefore, the scroll speed calculated in step S1605 may be an initial speed during scroll display, or an average speed thereof.

Figure 9:
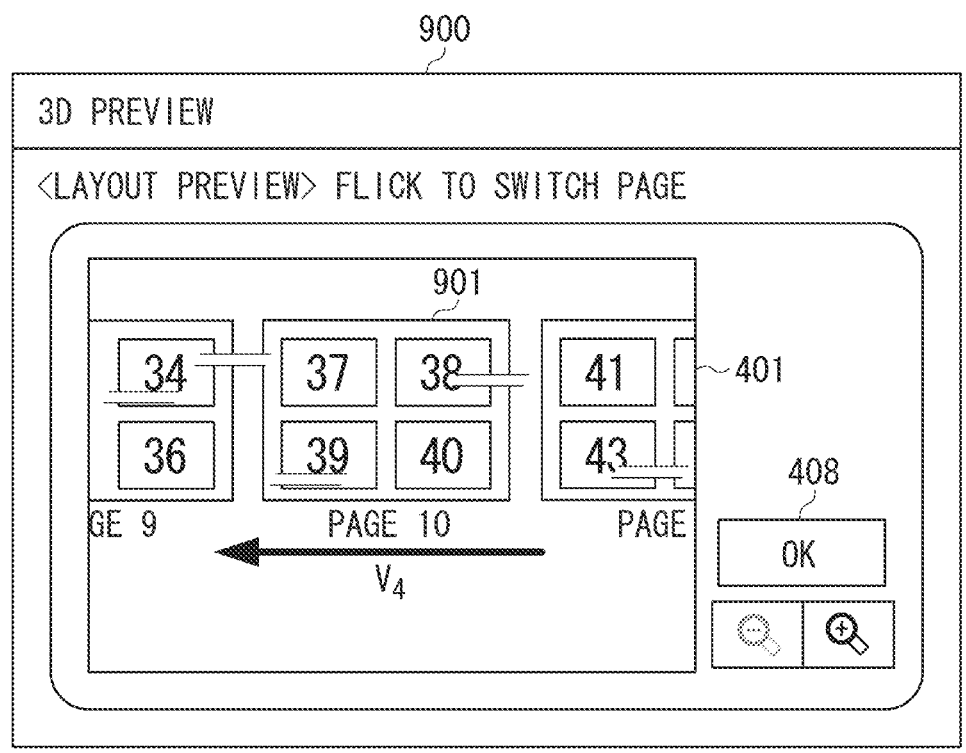
FIG. 9 illustrates a movement speed during a preview and flick operation performed when page collation is set according to an exemplary embodiment.

After the scroll speed is calculated in step S1605, in step S1606, the CPU 111 performs a scroll display on the display 119 based on the scroll speed and the scroll distance calculated in step S1604. FIG. 9 illustrates an example of a screen during a scroll display. After performing the display corresponding to the calculated scroll distance based on the calculated scroll speed, then in step S1607, the CPU 111 stops the scroll display.

FIG. 9 illustrates a display example when a physical page 901 (the tenth page) is displayed during scroll movement by the flick operation illustrated in FIG. 4B.

The scroll speed at this time is compared with a speed in a case where a similar physical page 1001 (the tenth page) is displayed by performing the similar flick operation (same speed and distance) in FIG. 5A when page collation is not set (1-in-1).

Figure 10:
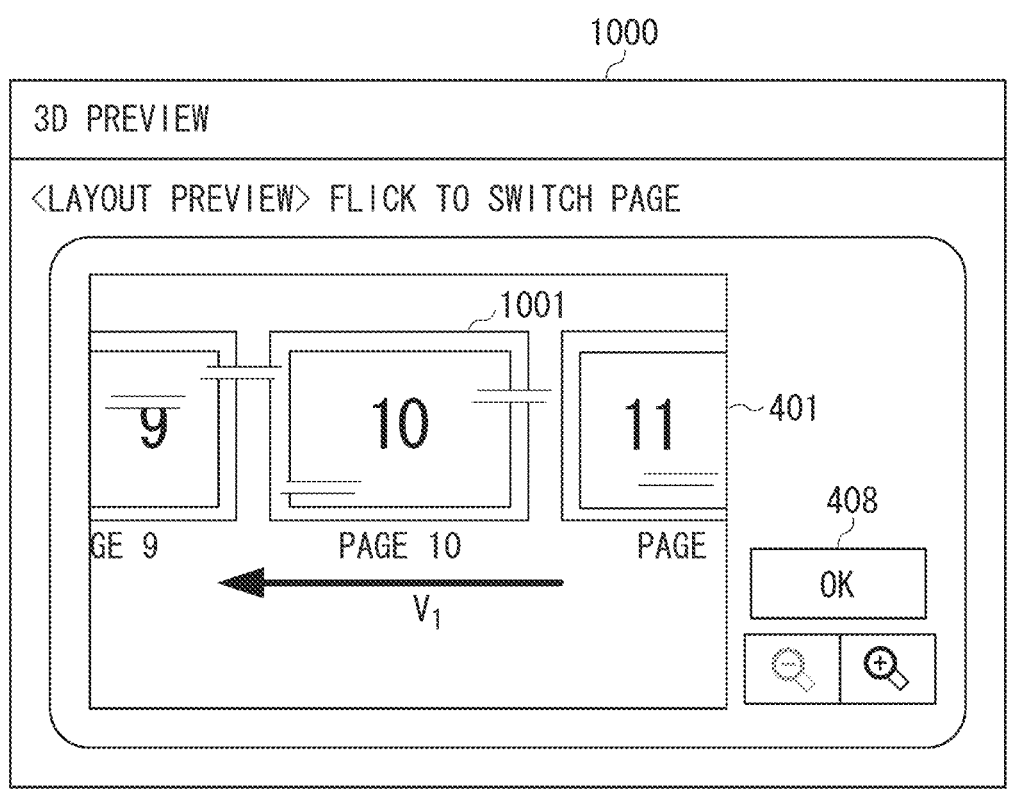
FIG. 10 illustrates a movement speed during a preview and flick operation performed when page collation is not set according to an exemplary embodiment.

If the scroll speed when the tenth physical page 901 when the page collation is set is displayed as illustrated in FIG. 9 is V4, and the scroll speed when the page collation is not set as illustrated in FIG. 10 is V1, then the scroll speed has a relation such as V4<V1.

Thus, in the case illustrated in FIG. 9, in which the amount of information on one physical page is greater than that in FIG. 10, the user can more easily confirm the content of each and every page even during the scroll display by reducing the scroll speed.

Similar to the first exemplary embodiment, the present exemplary embodiment can be applied to not only a case where the page collation printing is set, but also a case where the two-sided printing is set. When the two-sided printing is set, a setting value relating to a two-sided setting is used as the printing layout parameter set in step S1603.

Figure 12:
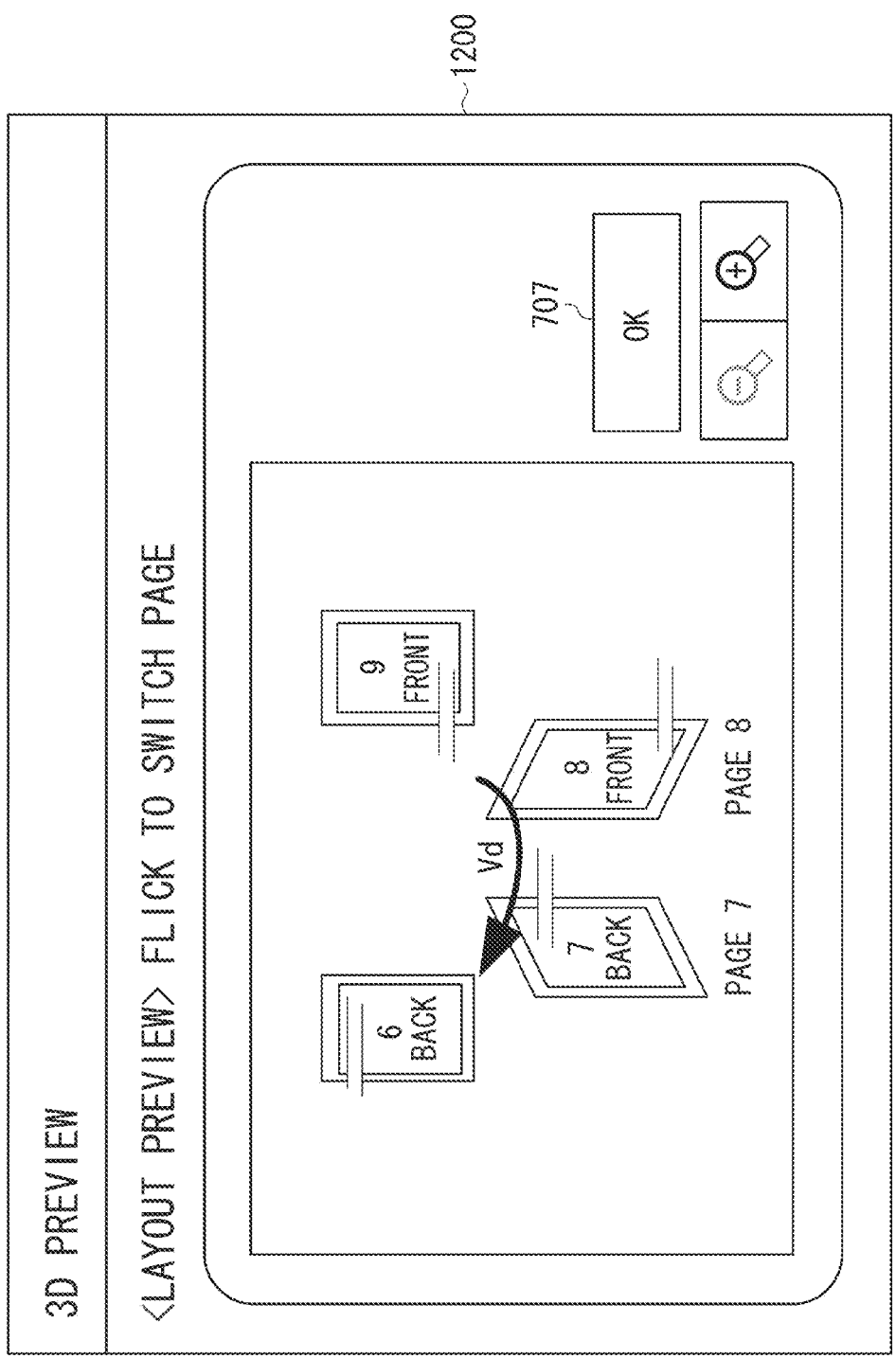
FIG. 12 illustrates a movement speed during a preview and flick operation performed when two-sided printing is set according to a second exemplary embodiment.
Figure 13:
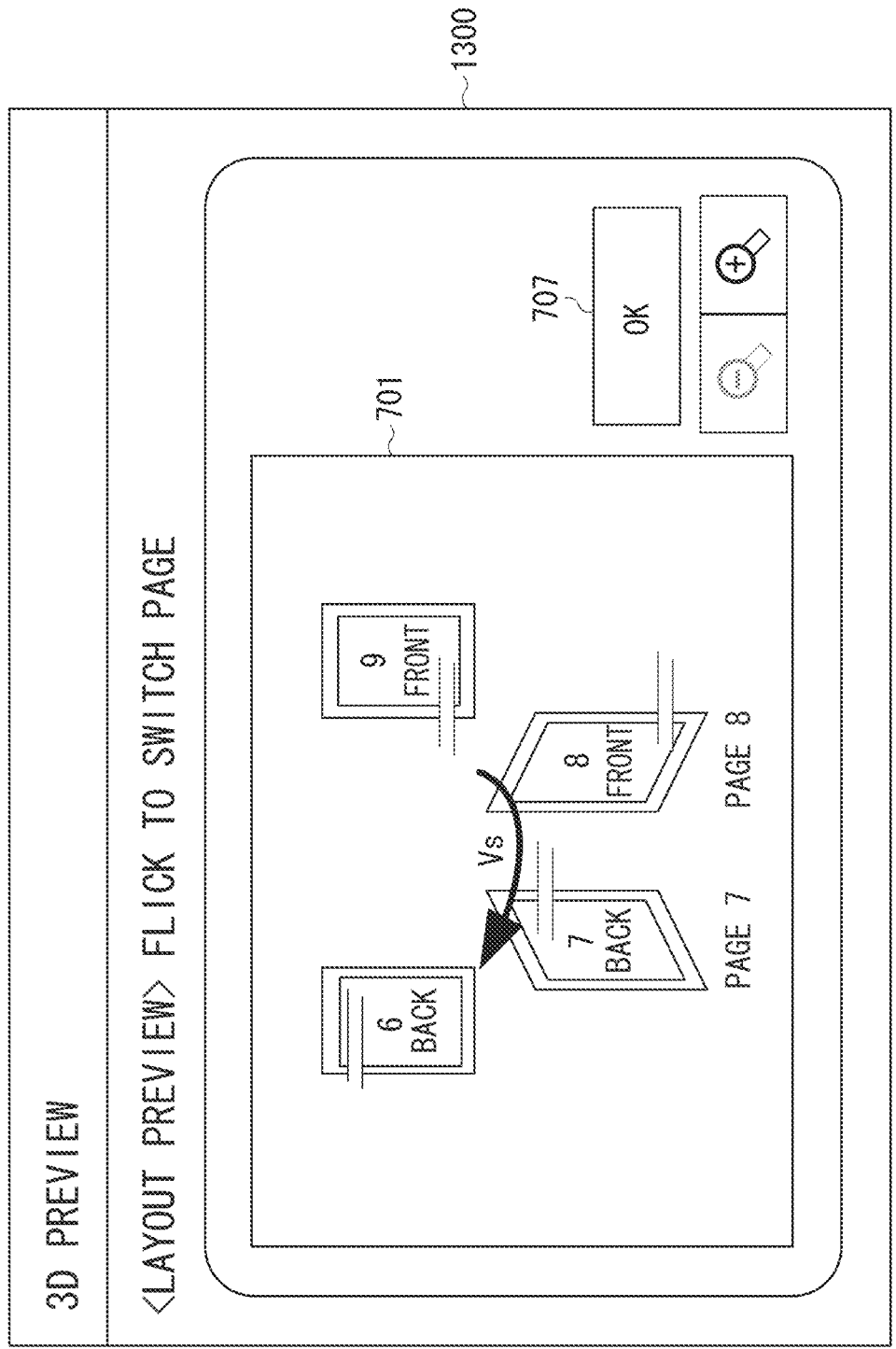
FIG. 13 illustrates a movement speed during a preview and flick operation performed when one-sided printing is set according to a second exemplary embodiment.

FIG. 12 illustrates a display example of a 3D preview displayed on the display 119 when the two-sided printing is set, in which the scroll speed of the scroll display by a flick operation is Vd. In contrast, FIG. 13 illustrates a display example of a 3D preview displayed on the display 119 when the two-sided printing is not set, i.e., when one-sided printing is set, in which the scroll speed of the scroll display by a flick operation is Vs. The speed v is set in step S1605 so as to satisfy the relation Vd<Vs when these scroll speeds are compared. For example, control of the scroll distance and the scroll speed when the two-sided printing is set may be performed in the similar manner as when a 2-in-1 layout is set when the page collation printing is set.

As described above, according to the present exemplary embodiment, when a preview display is scrolled by a flick operation, a scroll speed is determined in consideration of the setting parameters for the page collation printing and the two-sided printing. More specifically, when the page collation printing or the two-sided printing is set, the scroll speed for a flick operation at the same speed and distance is set to be slower than when these settings are not made. This configuration can prevent the user from overlooking a desired logical page during the scroll display when the page collation printing and the two-sided printing are not set.

In the above first and second exemplary embodiments, examples are described in which a common page collation setting and two-sided setting are performed for a plurality of pages. However, the present invention can also be applied when a layout setting can be individually set for each page.

Figure 11:
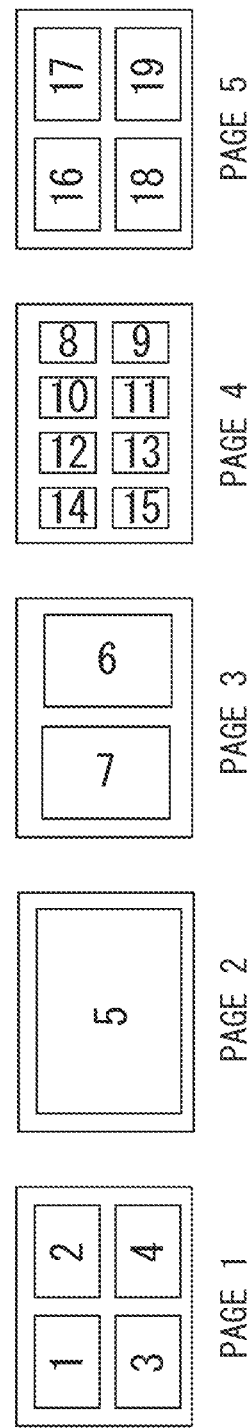
FIG. 11 illustrates a setting example of a movement speed during a flick operation performed when page collation can be set for each print page according an exemplary embodiment.

FIG. 11 illustrates a case in which the layout setting can be individually changed for each page. In the example illustrated in FIG. 11, a 4-in-1 layout, no page collation setting, a 2-in-1 layout, an 8-in-1 layout, and a 4-in-1 layout are set for five physical pages, respectively.

When a flick operation is performed at a first physical page position, for example, there are several methods for determining a scroll distance and a scroll speed.

One method is to determine the scroll distance and the scroll speed based on the maximum number of laid out logical pages among all of the physical pages. This method determines the scroll distance and the scroll speed based on the page of which value of N is the largest in the N-in-1 layout pages as a reference. According to the example illustrated in FIG. 11, since the 8-in-1 layout of the fourth physical page is the largest, the scroll distance and the scroll speed are determined based on this parameter.

Another method is to determine the scroll distance and the scroll speed based on an average value of the number of laid out logical pages for all of the physical pages. According to the example illustrated in FIG. 11, since the number of logical pages is 19 and the number of physical pages is 5, the average value is 4 (decimal places rounded off). Therefore, the scroll distance and the scroll speed are determined using this value. In addition, the parameter for determining the scroll distance and the scroll speed may also be calculated based on some other method.

In the example illustrated in FIG. 11, the scroll distance and the scroll speed may be changed for each of the currently-displayed pages. More specifically, the scroll speed may be set to be slower for a page of which value of N in an N-in-1 layout is greater, and faster for a page of which value of N in an N-in-1 layout is smaller. The scroll distance can also be controlled in the similar manner based on page units.

According to the first exemplary embodiment, the scroll distance during a flick operation is changed based on a preview performed when the page collation or the two-sided printing is set. In contrast, according to the second exemplary embodiment, the scroll speed during a flick operation is changed based on a preview performed when the page collation or the two-sided printing is set. However, the present invention is not limited to changing any one of the scroll distance and the scroll speed, both of these may be changed. More specifically, in a case where the page collation or the two-sided printing is set, when a preview operation is performed on a preview display, the scroll speed can be reduced while shortening the scroll distance. Accordingly, the display during scrolling is much easier for a user to view, which can prevent a desired image from being scrolled against the user's intention due to a flick.

Further, in the description of the above exemplary embodiments, images displayed on the display unit including the touch panel are pre-printing preview images. However, an image subjected to the processing in FIGS. 14 to 16 is not limited to a preview image. The present invention is not limited to a pre-printing preview image, and can also be applied to a case where any image in which a plurality of logical pages is laid out in a single physical page is displayed.

Further, according to above exemplary embodiments, a case in which page collation or two-sided printing is set is described. However, the special image processing serving as a condition for changing the scroll distance or the scroll speed is not limited to the page collation and the two-sided printing.

The present invention can also be applied to other image processing, or even to non-image processing. For example, the present invention can be applied to post-processing performed on the printing paper, such as stapling processing, punching processing, and paper folding.

Further, in the description of the above exemplary embodiments, the scroll distance is shortened or the scroll speed is reduced when specific image processing is performed. However, a method for making it easier for a user to view an image can also be employed by lengthening the scroll distance or increasing the scroll speed when specific image processing is performed. In other words, when there is a large amount of information (amount of images) to be rendered on a single sheet or a single surface in a N-in-1 layout or two-sided printing, the above exemplary embodiments shortens the scroll distance or reduces the scroll speed to ensure visibility.

Based on the same method of thinking, when an image to be rendered on a single sheet or a single surface is enlarged, or when image processing is set that enlarges an image of one sheet and lays out the enlarged image on two sheets, the scroll distance may be lengthened or the scroll speed may be increased to perform scroll display in these cases. In other words, when the amount of information (amount of images) to be rendered on a single sheet or a single surface has decreased, the scroll distance may be lengthened or the scroll speed may be increased in conjunction with the decrease. In any case, the present invention is characterized by allowing the scroll distance and the scroll speed to be varied based on whether special image processing is performed.

Further, according to the above exemplary embodiments, although an MFP is described as an example of an apparatus to which the present invention can be applied, the apparatus to which the present invention is applied can be any image processing apparatus that at least processes image data. More specifically, the present invention can be applied to not only a MFP, but also any device including any types of image forming apparatuses such as a printing apparatus, a scanner, a facsimile (FAX), and a digital camera, and information processing apparatuses such as a personal computer (PC) and a mobile information terminal to name but a few.

Further, according to the above exemplary embodiments, a flick operation is described as an example of an operation to be performed by a user to perform a scroll display. However, embodiments of the present disclosure can be realized without being limited to a flick operation as the operation by the user to perform a scroll display. For example, as long as a scroll display is performed, the present disclosure can also be implemented by an operation other than a flick operation on a touch panel.

In other words, as long as a displayed image is subjected to the scroll display by a predetermined operation by a user, concepts of the present invention can be implemented. Examples of the predetermined operation include, in addition to a flick operation on a touch panel, some other gesture operation performed by touching the touch panel, and a gesture operation (a spatial gesture operation) that is performed without touching the touch panel.

Further, regarding the display of an image subjected to the scroll display, it is not limited to the image displayed to a display unit including a touch panel. The image may be projected on some kind of screen using an image projection apparatus, such as a projector. The scroll display can be performed by performing a predetermined gesture operation (spatial gesture or the like) on the projected image.

Some aspects of the present disclosure can also be realized by a computer of a system or an apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-030818 filed Feb. 15, 2012, which is hereby incorporated by reference herein in its entirety.

What is claimed is:

1. An image forming apparatus comprising:
a display unit including a touch panel;
a printing unit configured to execute a print job;
a preview display unit configured to display a preview of each page of the print job on the display unit before printing the print job;
a specification unit configured to specify a specific printing method for laying out and printing a plurality of pages of documents on one sheet of printing paper as a setting of the print job; and
a display control unit configured to perform a scroll display on each page displayed in preview by the preview display unit according to a flick operation performed on a touch panel,
wherein the display control unit is configured to set a scroll distance in a scroll display performed during a preview display of a print job to which the specific printing method is specified to be shorter than a scroll distance in a scroll display performed during a preview display of a print job to which the specific printing method is not specified, and
wherein the display control unit is configured to set a scroll distance in a scroll display performed during a preview display of a print job to which a printing method based on an N-in-1 layout is specified to be 1/N the scroll distance in a case where the printing method is not specified.

2. The image forming apparatus according to claim 1, wherein the specific printing method is a printing method for performing printing in an N-in-1 layout in which N pages of documents are regarded as N pages of logical pages, and each of the N pages of logical pages is reduced in size and laid out on one surface of a single sheet of printing paper, and
wherein the display control unit is configured to set a scroll distance in a scroll display performed during a preview display of a print job to which a printing method based on an N-in-1 layout is specified to be shorter as a value of N increases.

3. The image forming apparatus according to claim 1, wherein the specific printing method is two-sided printing.

4. The image forming apparatus according to claim 1, further comprising a scanner configured to generate image data by reading a document,
wherein the preview display is a preview display performed in a case where printing of image data generated by the scanner is executed.

5. An image forming apparatus comprising:
a display unit including a touch panel;
a printing unit configured to execute a print job;
a preview display unit configured to display a preview of each page on the display unit before printing of the print job;
a specification unit configured to specify execution of specific image processing to the print job; and
a display control unit configured to perform a scroll display on each page displayed in preview by the preview display unit according to a flick operation performed on a touch panel,
wherein the display control unit is configured to set a scroll distance or a scroll speed in a scroll display performed during a preview display of a print job to which a printing method based on an N-in-1 layout is specified to be 1/N the scroll distance in a case where the printing method is not specified.

6. A method for controlling an image forming apparatus having a display unit that includes a touch panel, the method comprising:
executing a print job;
displaying a preview of each page on the display unit before printing of the print job;
specifying a specific printing method for laying out and printing a plurality of pages of documents on one sheet of printing paper as a setting of the print job; and performing display control to perform a scroll display on each page displayed in preview according to a flick operation performed on a touch panel, wherein the display control sets a scroll distance in a scroll display performed during a preview display of a print job to which a printing method based on an N-in-1 layout is specified to be 1/N the scroll distance in a case where the printing method is not specified.

7. A non-transitory storage medium storing a program for causing a computer to execute a method according to claim 6.

* * * * *